US012523027B2

(12) United States Patent
Muraoka

(10) Patent No.: US 12,523,027 B2
(45) **Date of Patent: *Jan. 13, 2026**

(54) SHOWER SYSTEMS

(71) Applicant: Kohler Co., Kohler, WI (US)

(72) Inventor: Hiroyuki Chanseol Muraoka, New York, NY (US)

(73) Assignee: Kohler Co., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,289

(22) Filed: Dec. 12, 2023

(65) Prior Publication Data

US 2024/0125101 A1 Apr. 18, 2024

Related U.S. Application Data

(63) Continuation of application No. 18/068,243, filed on Dec. 19, 2022, now Pat. No. 11,879,240, which is a continuation of application No. 16/655,631, filed on Oct. 17, 2019, now Pat. No. 11,566,406.

(30) Foreign Application Priority Data

Dec. 5, 2018 (CN) ......................... 201822035448.3

(51) Int. Cl.
*E03C 1/06* (2006.01)
*A47K 3/28* (2006.01)
*B05B 1/18* (2006.01)
*E03C 1/05* (2006.01)

(52) U.S. Cl.
CPC .............. *E03C 1/066* (2013.01); *A47K 3/281* (2013.01); *B05B 1/18* (2013.01); *E03C 1/055* (2013.01)

(58) Field of Classification Search
CPC ........................................................ E03C 1/066
See application file for complete search history.

(56) References Cited

U.S. PATENT DOCUMENTS

| | | | | |
|---|---|---|---|---|
| 2,898,605 A | | 8/1959 | Pearson | |
| 2,997,722 A | | 8/1961 | Pearson | |
| 4,360,159 A | * | 11/1982 | Haynes | E03C 1/066 4/596 |
| 4,651,720 A | | 3/1987 | Baus | |
| 4,967,965 A | | 11/1990 | Kragle | |
| 5,093,942 A | | 3/1992 | Lang | |
| 5,339,469 A | | 8/1994 | Gilles | |
| 6,338,170 B1 | | 1/2002 | De Simone | |
| 6,349,428 B1 | | 2/2002 | Nasr et al. | |

(Continued)

FOREIGN PATENT DOCUMENTS

| | | |
|---|---|---|
| EP | 0 252 777 A1 | 1/1988 |
| EP | 0 510 184 A1 | 10/1992 |

(Continued)

OTHER PUBLICATIONS

Dreamspa—All Chrome Water Temperature; Jun. 6, 2014.

(Continued)

*Primary Examiner* — Christine J Skubinna
(74) *Attorney, Agent, or Firm* — Foley & Lardner LLP

(57) ABSTRACT

A shower system includes a sprayer moveably coupled with a shower column and a control system operably coupled with the sprayer. The control system can automatically change a position of the sprayer along the shower column.

20 Claims, 21 Drawing Sheets

(56) References Cited

U.S. PATENT DOCUMENTS

| | | | | |
|---|---|---|---|---|
| 6,519,790 | B2 | 2/2003 | Ko | |
| 6,550,079 | B2 | 4/2003 | Gransow et al. | |
| 6,715,699 | B1 | 4/2004 | Greenberg et al. | |
| 6,920,654 | B2 | 7/2005 | Noguchi et al. | |
| 7,065,807 | B1 | 6/2006 | Stout, Jr. | |
| 7,191,475 | B1 | 3/2007 | Marcotte | |
| 7,325,260 | B1 | 2/2008 | Hoyt | |
| 7,360,723 | B2 | 4/2008 | Lev | |
| 7,707,664 | B1 | 5/2010 | Flynn | |
| 7,941,877 | B2 | 5/2011 | Gardenier et al. | |
| 9,095,862 | B2 * | 8/2015 | Hanna | B05B 1/185 |
| 9,199,262 | B2 | 12/2015 | Bartelick | |
| 9,242,259 | B2 | 1/2016 | Jeronimus | |
| 9,266,136 | B2 | 2/2016 | Klicpera | |
| 9,486,817 | B2 | 11/2016 | Patton et al. | |
| 9,584,892 | B2 | 2/2017 | Berkman et al. | |
| 9,872,095 | B2 | 1/2018 | Lee | |
| 2009/0293190 | A1 * | 12/2009 | Ringelstetter | E03C 1/057 4/605 |
| 2014/0197250 | A1 | 7/2014 | Jeronimus | |
| 2014/0201903 | A1 * | 7/2014 | Bronstein | E03C 1/066 4/615 |
| 2015/0034738 | A1 | 2/2015 | Xu et al. | |
| 2015/0271583 | A1 | 9/2015 | Wan | |
| 2015/0354185 | A1 | 12/2015 | Tseng et al. | |
| 2016/0237661 | A1 | 8/2016 | Teagarden | |
| 2017/0225186 | A1 | 8/2017 | Ferguson et al. | |
| 2018/0257090 | A1 | 9/2018 | Hawkins | |
| 2019/0045980 | A1 * | 2/2019 | Yu | F16K 31/02 |
| 2020/0078802 | A1 * | 3/2020 | Chung | B05B 1/18 |

FOREIGN PATENT DOCUMENTS

| | | | | |
|---|---|---|---|---|
| EP | 1 457 608 | A2 | 9/2004 | |
| EP | 1 609 918 | A2 | 12/2005 | |
| EP | 1 793 051 | A2 | 6/2007 | |
| EP | 2 085 143 | A1 | 8/2009 | |
| EP | 2 218 512 | A1 | 8/2010 | |
| EP | 2 896 757 | A2 | 7/2015 | |
| EP | 3 309 306 | A2 | 4/2018 | |
| EP | 3 375 338 | A1 | 9/2018 | |
| WO | WO-95/29300 | A1 | 11/1995 | |
| WO | WO-2004/103135 | A1 | 12/2004 | |
| WO | WO-2004/107945 | A1 | 12/2004 | |
| WO | WO-2007/051367 | A1 | 5/2007 | |
| WO | WO-2010/021765 | | 2/2010 | |
| WO | WO-2011/088436 | | 7/2011 | |
| WO | WO-2011088436 | A2 * | 7/2011 | B05B 1/16 |
| WO | WO-2014/048399 | A1 | 4/2014 | |
| WO | WO-2018/091864 | A1 | 5/2018 | |

OTHER PUBLICATIONS

Foreign Action other than Search Report on CN 2018220354483 DTD Nov. 8, 2019.

Kohler—Moxie Showerhead Wireless Speaker Bathroom New Products; Jan. 30, 2017.

Thermasol—Serenity Light Sound Rain Head; Mar. 9, 2017.

* cited by examiner

SHOWER SYSTEMS

CROSS-REFERENCE TO RELATED PATENT APPLICATIONS

This application is a Continuation of U.S. patent application Ser. No. 18/068,243, filed Dec. 19, 2022, which is a Continuation of U.S. patent application Ser. No. 16/655,631 (now U.S. Pat. No. 11,566,406), filed Oct. 17, 2019, which claims the benefit of and priority to Chinese Utility Model Application No. 201822035448.3, filed Dec. 5, 2018, the entire disclosures of which are hereby incorporated by reference herein.

BACKGROUND

The present disclosure relates generally to shower systems. More specifically, the present disclosure relates to a shower system including a shower column with a retractable conduit system, a height-adjustable handheld sprayer and associated accessories, and a control system that allows for synchronization of music and light with the discharge of water from the handheld sprayer and other water delivery devices in a shower environment.

SUMMARY

At least one embodiment relates to a shower column including a retractable flexible conduit system configured to enable the flexible conduit to automatically retract into the shower column or into a fixed wall of a building.

At least one embodiment relates to a handheld sprayer that is configured to be maintained at adjustable heights. A shower column may include a track that couples to a receiver for a handheld sprayer. The receiver may include a sensor and a motor coupled to the track to automatically control a height of the handheld sprayer relative to a user. The handheld sprayer and/or the receiver may include a button for a user to interface with to manually lock or unlock the receiver and change the desired height at which the handheld sprayer is maintained.

At least one embodiment relates to a handheld sprayer having a primary sprayhead and an electronically-controlled diverter that can allow for the sprayer to provide different spray modes without any moving mechanical components inside the sprayhead. The primary sprayhead includes a plurality of openings to provide various spray modes/patterns. The handheld sprayer includes a plurality of internal walls/layers disposed at different heights or levels within the sprayer. The different layers each include one or more channels that are in fluid communication with each of the openings behind the spray face. The different layers are in separate fluid communication with a water source by an electronically-controlled diverter to selectively provide a flow of water to each of the openings. The different channels interface with each of the openings at different relative positions, so as to create different spray patterns depending on which layer of the sprayer is receiving water.

At least one embodiment relates to a handheld sprayer which includes a primary sprayhead having openings through which a primary spray is discharged, and a secondary sprayhead disposed on a handle of the sprayer and having openings through which a secondary spray is discharged. The secondary sprayhead is removably coupled to the sprayer, and is configured to be selectively removed by a user to allow for interchanging different sprayheads having different spray modes, as desired.

At least one embodiment relates to a shower system including a plurality of water delivery devices operatively coupled to a control system in a shower environment. The control system is also operatively coupled to an entertainment system including one or more speakers and one or more light sources coupled in the shower environment. The control system is operatively coupled to an input device configured to provide an audio input to the control system. The control system is configured to receive the audio input and to synchronize the audio input with the discharge of water from one or more of the plurality of water delivery devices and/or with the light output from the one or more light sources, so as to provide for an enhanced user experience.

At least one embodiments relates to a shower system comprising a support, a handheld sprayer, a flexible conduit, and a weight. The support is configured to be coupled in a shower environment. The handheld sprayer is disposed below the support. The flexible conduit is coupled to the handheld sprayer, and extends through the support. The weight is coupled to the flexible conduit opposite the handheld sprayer. The weight is configured to bias the handheld sprayer to a first position in the shower environment.

At least one embodiment relates to a shower system comprising a shower column, a handheld sprayer, a flexible conduit, and a weight. The shower column includes an upper support configured to be coupled in a shower environment. The handheld sprayer is disposed adjacent the shower column. The flexible conduit includes a first portion coupled to the handheld sprayer and a second portion extending past the upper support opposite the handheld sprayer. The weight is coupled to the second portion of the flexible conduit, and is configured to bias the handheld sprayer to a position in the shower environment.

At least one embodiment relates to a shower system comprising a shower column, a handheld sprayer, a flexible conduit, and a weight. The shower column includes an upper support configured to be coupled in a shower environment. The handheld sprayer is disposed adjacent the shower column below the upper support. The flexible conduit includes a first portion coupled to the handheld sprayer and a second portion extending past the upper support opposite the handheld sprayer. The weight is coupled to the second portion of the flexible conduit, and is configured to bias the handheld sprayer to a first position in the shower environment. The second portion of the flexible conduit including the weight is configured to be disposed behind a fixed wall of the shower environment.

In some exemplary embodiments, the support includes a pulley, wherein the flexible conduit is looped at least partially around the pulley, and wherein the pulley is configured to rotate when the handheld sprayer is selectively moved from the first position.

In some exemplary embodiments, the support includes a fixed guide member, wherein the flexible conduit is looped at least partially around the fixed guide member, and wherein the flexible conduit is configured to translate relative to the fixed guide member when the handheld sprayer is selectively moved from the first position.

In some exemplary embodiments, a portion of the flexible conduit including the weight is configured to be disposed behind a fixed wall of the shower environment.

In some exemplary embodiments, a portion of the flexible conduit including the weight is configured to be disposed in a cover adjacent the shower column.

In some exemplary embodiments, the shower system further comprises a shower column including a track, and a receiver in moving engagement with the track, wherein the handheld sprayer is configured to be biased against the receiver by the weight.

In some exemplary embodiments, the shower system further comprises a control system, wherein the receiver is in moving engagement with the track by a body, wherein the body includes a sensor configured to detect a parameter of a user in the shower environment, wherein the sensor is further configured to send a corresponding signal to the control system, and wherein the control system is configured to change a height of the receiver along the track in response to the detected parameter.

In some exemplary embodiments, the sensor is a laser sensor.

In some exemplary embodiments, the body further includes a motor, and wherein the control system is configured to change the height of the receiver by controlling the motor in response to the detected parameter.

This summary is illustrative only and is not intended to be in any way limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
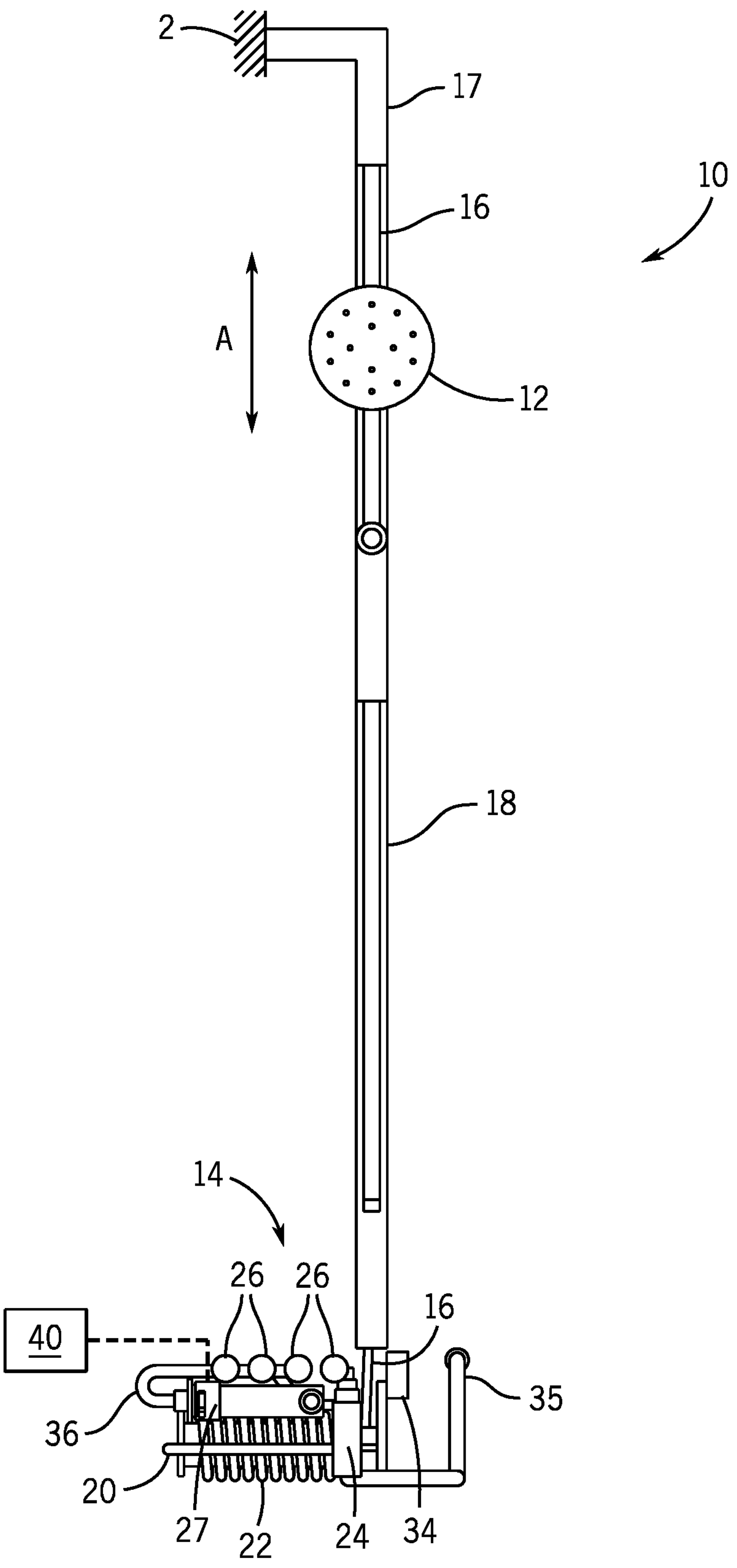
FIG. 1 is a front view of a shower system according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Generally speaking, a shower system can include a shower column having one or more water delivery devices positioned at fixed locations in a shower environment. For example, the shower column can include a handheld sprayer. The handheld sprayer typically includes an extended length of hose or flexible conduit that can allow for a user to remove the sprayer from a docked location in the shower environment and selectively position the sprayer closer to the user's body to, for example, perform a rinsing task. The entire length of hose is typically exposed within the shower environment, which can get in the way of the user when, for example, the user is attempting to use a different water delivery device in the shower environment, such as an overhead showerhead, or when the sprayer is otherwise in the docked location. In addition, the exposed length of hose can be unsightly in a shower environment when the sprayer is in the docked location.

Additionally, conventional handheld sprayers are typically docked or placed at a fixed height along the shower column, so as to allow for a user to use the handheld sprayer in a hands-free manner in the shower environment. Having the handheld sprayer docked at a fixed height can, however, be limiting depending on a user's height, as the discharged spray may not be as effective or enjoyable for a user if the spray face of the sprayer is located too far away from, or too close to, the user.

Additionally, conventional handheld sprayers typically include a complex assembly of internal moving mechanical parts behind the spray face to provide different spray patterns/modes, such as impellers or other moving parts. These moving mechanical parts, however, can be prone to failure and can result in a more costly assembly to manufacture.

Additionally, conventional handheld sprayers typically include only one sprayhead fixed at one location on the sprayer to provide a discharged spray. That is, conventional handheld sprayers do not include more than one sprayhead disposed at a different location on the sprayer to provide different spray experiences/modes for a user.

Additionally, some conventional shower systems include a plurality of water delivery devices and an entertainment system (e.g., audio system, lighting system, etc.) coupled in a shower environment to provide a user experience. The discharge of water from the water delivery devices in these systems, however, is typically separately controlled and independent from any audio or visual entertainment provided by the entertainment system.

It would be advantageous to provide a shower system including a shower column, a handheld sprayer, and an entertainment system that can overcome the above-noted limitations associated with conventional shower systems, so as to provide for an improved user experience.

Figure 2:
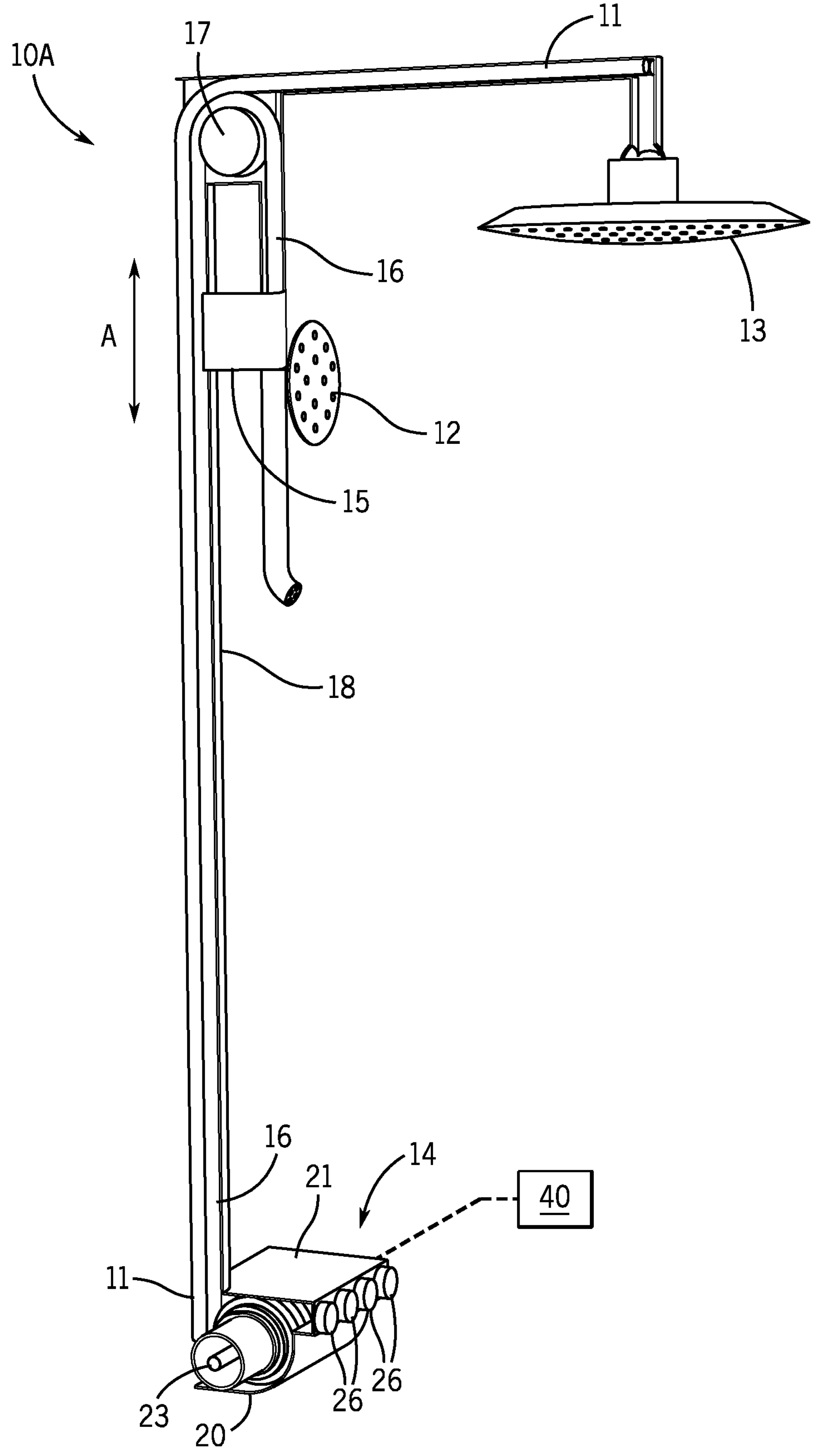
FIG. 2 is a perspective view of a shower system according to another exemplary embodiment.
Figure 3:
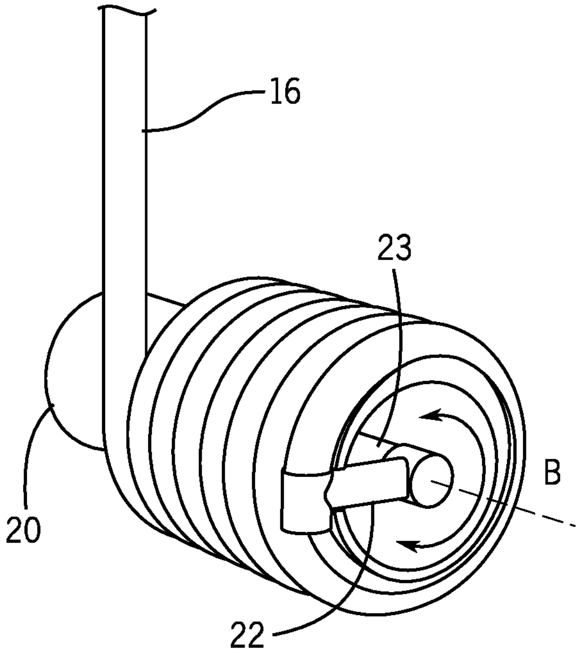
FIG. 3 is a partial perspective of a conduit reel of the shower system of FIG. 2.

Referring to FIGS. 1-3, two different shower environments are shown to include a shower system 10 (FIG. 1) and a shower system 10A (FIG. 2), according to two exemplary embodiments. The shower system 10 and the shower system 10A are identical except for the addition of an overhead showerhead 13 and a cover 21 in the shower system 10A. Each of the shower systems 10, 10*a* includes a handheld sprayer 12 coupled to a shower column 18. The handheld sprayer 12 is shown received in a receiver 15 (e.g., mount, dock, cradle, etc.), such that a user may selectively place the handheld sprayer 12 on the receiver 15 and have hands-free use of the handheld sprayer 12. The handheld sprayer 12 is fluidly coupled to a water source, such as a household water supply, by a flexible conduit 16 (e.g., flexible hose, etc.). The flexible conduit 16 is shown routed upward through a support 17, looped at least partially around the support 17, downward through the shower column 18, and wound at least partially around a conduit reel 20 (e.g., reel, cylindrical reel, drum, etc.). The support 17 is shown to include a pulley-like member that defines a pivot axis for the flexible conduit 16 to rotate or pivot about during movement of the handheld sprayer 12, as discussed in greater detail below. The conduit reel 20 is rotatably coupled to a fixed portion of the shower environment, such as a wall 2 of a building. The conduit reel 20 is configured to hold an unused length or portion of the flexible conduit 16 when the handheld sprayer 12 is in, for example, the docked position on the receiver 15 shown in FIGS. 1-2, such that the unused length of the flexible conduit 16 is not exposed in the shower environment and is stored in a hidden, organized manner for future use. In this manner, a user is free from potential interference of the entire length of flexible conduit 16 being exposed in the shower environment when the handheld sprayer 12 is in the docked position, and the shower environment is cleaner and more organized, as compared to conventional shower systems.

According to an exemplary embodiment, the conduit reel 20 is further configured to be selectively rotated to provide additional length of the flexible conduit 16 in the shower environment when, for example, a user has manually removed the handheld sprayer 12 from the receiver 15 to perform a rinsing task or when the height of the handheld sprayer 12 on the receiver 15 is selectively adjusted (e.g., automatically or manually). For example, when a user manually pulls the handheld sprayer 12 in a direction away from the receiver 15 closer to the user, as represented generally by arrow "A" in FIGS. 1-2, the conduit reel 20 is configured to rotate to unwind a corresponding length of the flexible conduit 16 for the user. The unwound portion of the flexible conduit 16 is guided upward through the column 18 and rotates about the pivot axis defined by the support 17 toward the user. According to an exemplary embodiment, the conduit reel 20 is configured to be selectively locked at a desired rotational position to provide a user with the desired length of the flexible conduit 16 in the shower environment without retracting the additional length of the conduit that was provided (e.g., by using a mechanical engagement member on the conduit reel, etc.). The conduit reel 20 may be rotationally biased in one direction using a biasing member (e.g., a spring, etc.), so as to automatically retract or wind up the exposed length of the flexible conduit 16 when a user wishes to return the handheld sprayer 12 to the receiver 15 (e.g., by disengaging the mechanical engagement member from the conduit reel, etc.). In this way, a user can selectively expose or hide different lengths of the flexible conduit 16 in/from a shower environment, so as to provide for a more organized and user-friendly shower environment.

Still referring to the embodiments of FIGS. 1-3, the flexible conduit 16 is fluidly coupled to a first conduit section 22, which is pivotably coupled to a second conduit section 23 disposed through a central opening of the conduit reel 20. In this way, the first conduit section 22 is configured to pivot or rotate relative to the second conduit section 23 in a direction indicated generally by arrow "B" about a longitudinal axis defined by the second conduit section 23 when the conduit reel 20 is selectively rotated. The second conduit section 23 is fluidly coupled to a mixing valve 24 of the shower system. The mixing valve 24 is fluidly coupled to a first water inlet line 35 and to a second water inlet line 36, which can each provide water for the shower systems 10, 10A. According to an exemplary embodiment, the first water inlet line 35 is in fluid communication with one of a hot water source or a cold water source, and the second water inlet line 36 is in fluid communication with the other of the hot water source or the cold water source. One or more diverter valves 27 are fluidly coupled to the system to allow for selective control of water flow/discharge between the handheld sprayer 12 and/or the overhead sprayhead 13.

Figure 4:
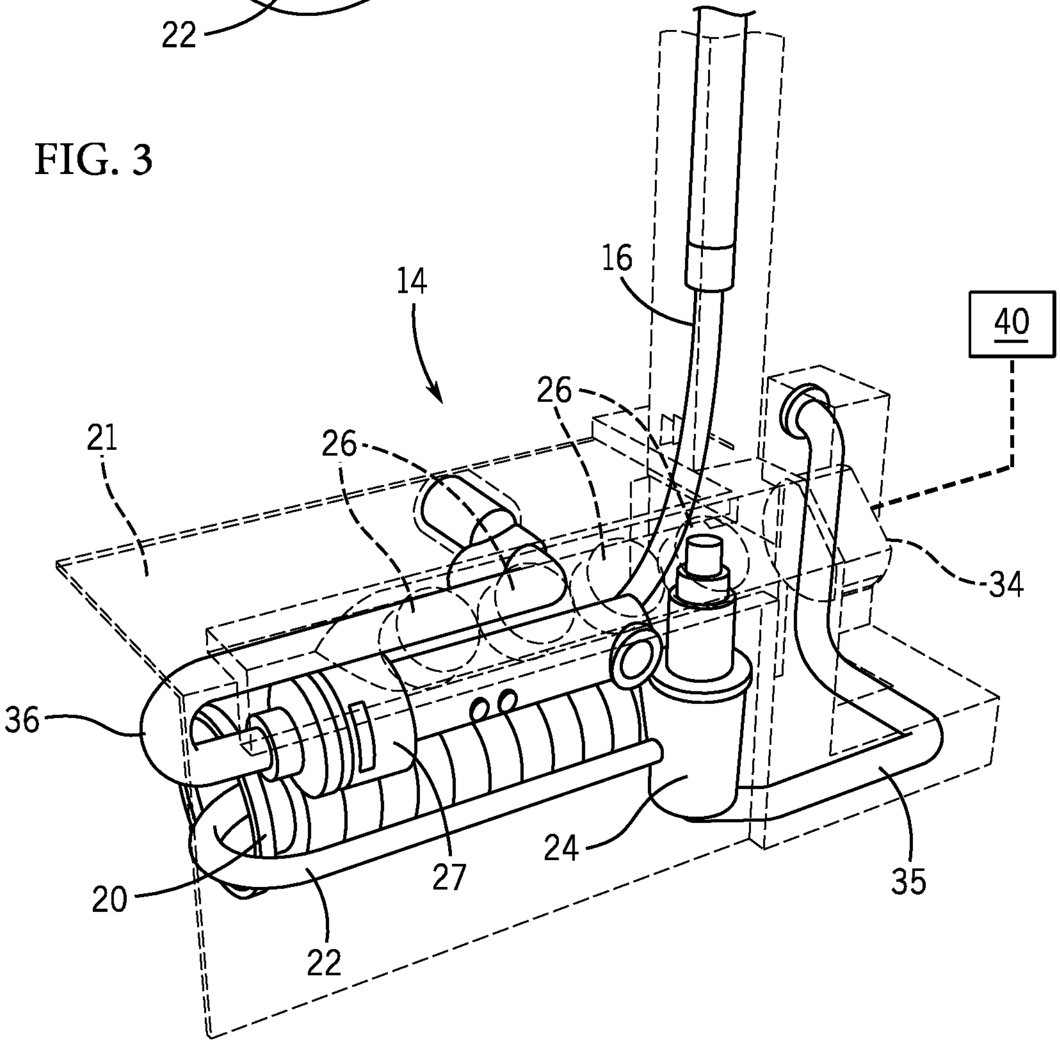
FIG. 4 is a partial perspective view of a portion of the shower system of FIG. 1.

According to an exemplary embodiment, each of the mixing valve 24 and the diverter valve 27 is electronically controlled. As shown in the embodiment of FIGS. 1-2 and 4, each of the mixing valve 24 and the diverter valve 27 is operatively coupled to a user interface 14 including a plurality of controls 26, shown as knobs, although other types of controls may be used (e.g., buttons, etc.), so as to allow a user to selectively control the flow volume, temperature, or spray pattern of water discharged by the handheld sprayer 12 and/or the overhead sprayhead 13. According to the exemplary embodiment of FIGS. 1-2, the user interface 14 includes a single temperature control 34 for controlling the water temperature for both the handheld sprayer 12 and the overhead sprayhead 13, although it is appreciated that the user interface 14 may include additional temperature controls or other controls to selectively and/or independently control various settings for each water delivery device in the system, according to other exemplary embodiments. The user interface 14, the mixing valve 24, and the diverter valve 27 are each operatively coupled to a control system 40 to allow for control of various parameters of the shower system, such as a height of the handheld sprayer, different customized spray programs, water temperature/volume settings based on user preferences, spray modes, or other parameters, the details of which are discussed below with reference to FIGS. 28-34.

Referring to the embodiment of FIG. 2, the shower system 10*a* further includes a cover 21 (e.g., shroud, decorative cover, etc.) for substantially concealing the conduit reel 20 and other system components from view of a user in the shower environment (e.g., mixing valve 24, diverter valve 27, etc.). The user interface 14 is shown disposed on/through a portion of the cover 21. According to other exemplary embodiments, the user interface 14 is located remotely from the cover 21 and the conduit reel 20 (e.g., on a wall in the shower environment, etc.). The shower system 10*a* also includes an overhead sprayhead 13 fluidly coupled to the first and second water inlet lines 35, 36 by a third conduit 11. The third conduit 11 is similarly routed past the support 17 and downward adjacent the shower column 18 toward the first and second water inlet lines 35, 36, but is configured to be fixed relative to the shower column 18. The overhead sprayhead 13 may be configured to provide one or more different spray modes, such as a "rain" mode, a deluge or "rinse" mode, a "mist" spray mode, or other spray modes.

Figure 5:
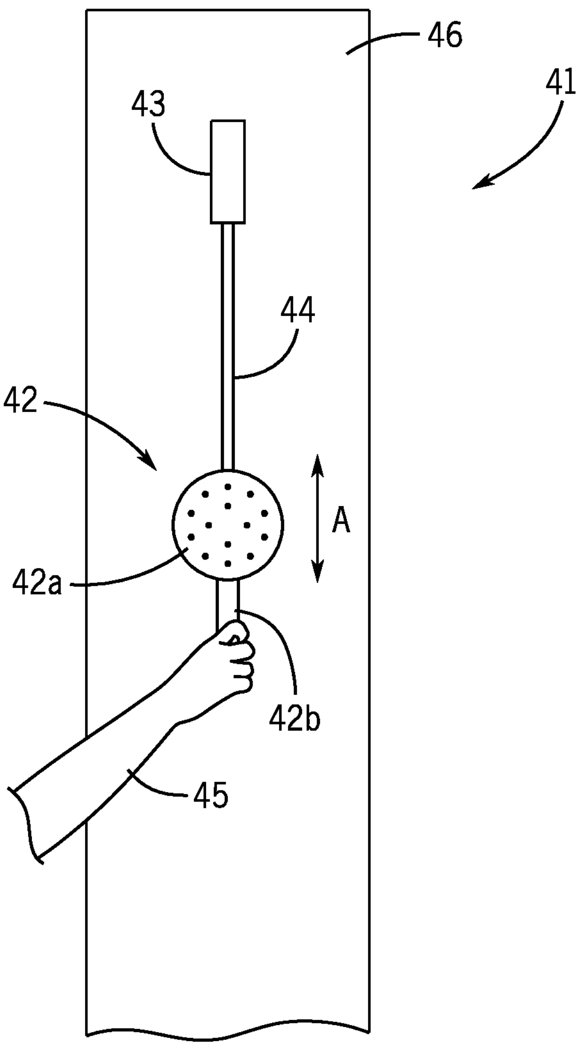
FIG. 5 is a front view of a shower column according to another exemplary embodiment.
Figure 6:
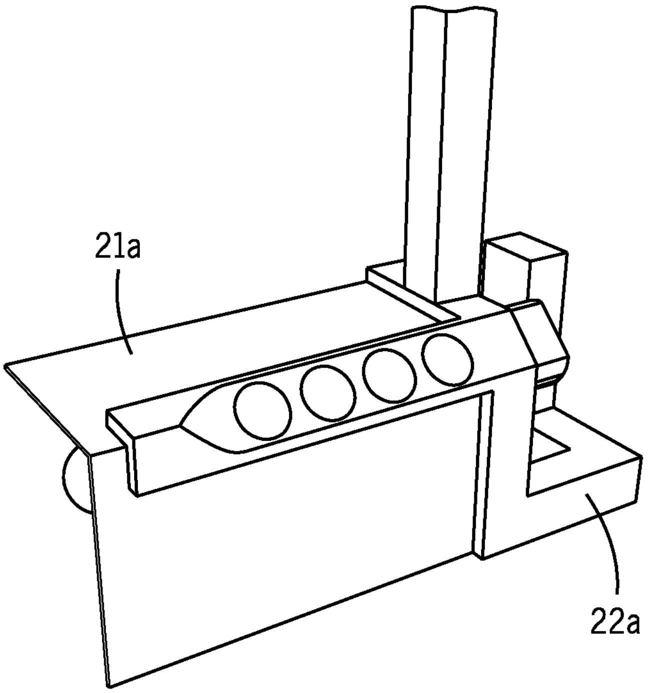
FIGS. 6-9 are partial perspective views of different configurations of the shower systems of FIGS. 1-2 according to various exemplary embodiments.
Figure 7:
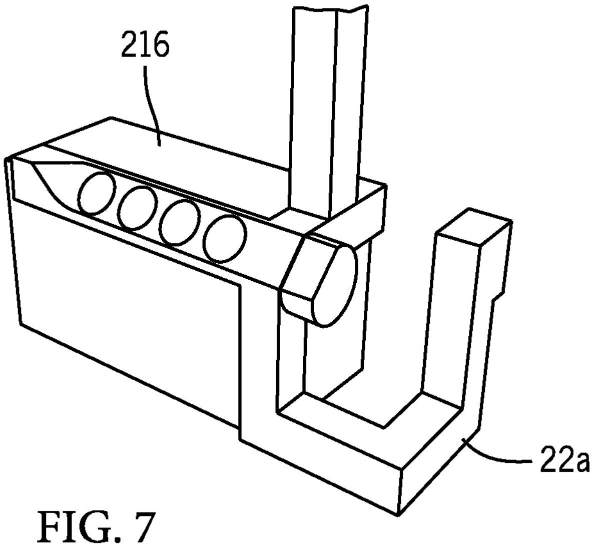
Figure 8:
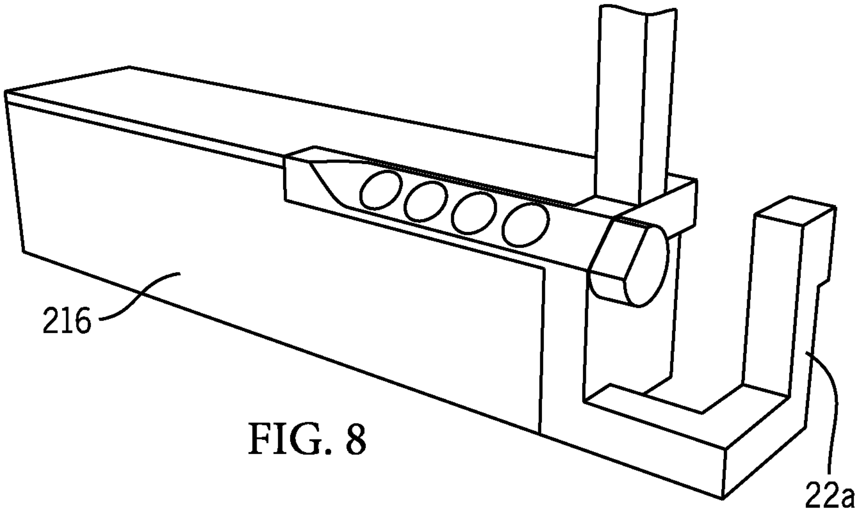

According to another exemplary embodiment shown in FIG. 5, a shower environment 41 is shown to include a shower column 43 including a handheld sprayer 42. In this exemplary embodiment, a substantial portion of the shower column 43 is recessed or disposed behind an enclosure 46, such that only an upper portion of the column is exposed in the shower environment 41 along with the handheld sprayer 42 and a portion of a flexible conduit 44. According to an exemplary embodiment, the enclosure 46 is part of the building structure that defines the shower environment 41. According to other exemplary embodiments, the enclosure 46 is a separate structure that is installed in the shower environment 41. The shower column 43 including the handheld sprayer 42 may be configured the same as the shower column 18 and the handheld sprayer 12 of the embodiments of FIGS. 1-2 discussed above. For example, the handheld sprayer 42 may be configured to allow a user 45 to selectively pull or retract the sprayer 42 in a direction indicated generally by arrow A, such that a length of the flexible conduit 44 can be selectively exposed in, or hidden from, the shower environment 41.

Figure 9:
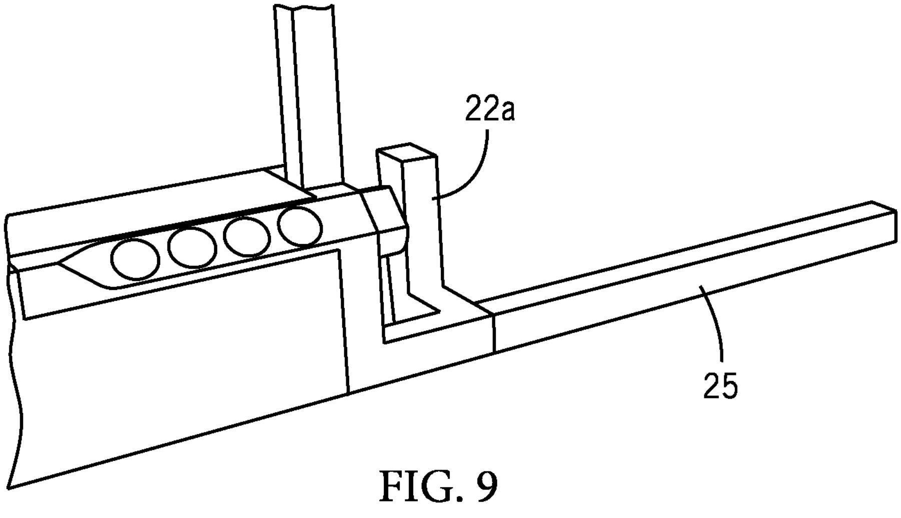

Referring to FIGS. 6-9, a plurality of different shower columns including different aesthetic configurations are shown according to various exemplary embodiments. For example, FIGS. 6-9 each illustrate various covers 21*a*, 21*b*, and 21*c* configured to conceal at least a portion of a shower column, such as a conduit reel (e.g., conduit reel 20, etc.) and associated plumbing (e.g., mixing valve 24, etc.). As shown, the covers 21*a*, 21*b*, 21*c* can have a variety of sizes, can include a variety of different surface treatments, such as different surface textures, colors, or finishes, and can include various materials or combinations of materials, such as metal, marble, stone, tile, or other materials, so as to, for example, substantially match adjacent walls in a shower environment. The shower columns of FIGS. 6-9 are also shown to include a conduit cover 22*a* to substantially conceal a fluid conduit, such as a hot/cold water inlet line (e.g., first and second water inlet lines 35, 36, etc.). As shown in the embodiment of FIG. 9, the shower column may include an elongated member 25 (e.g., bar, extension, etc.) extending outwardly away from the conduit cover 22*a*, which may provide an area for a user to hold various shower accessories, such as wash cloths, towels, or other shower accessories.

Figure 10:
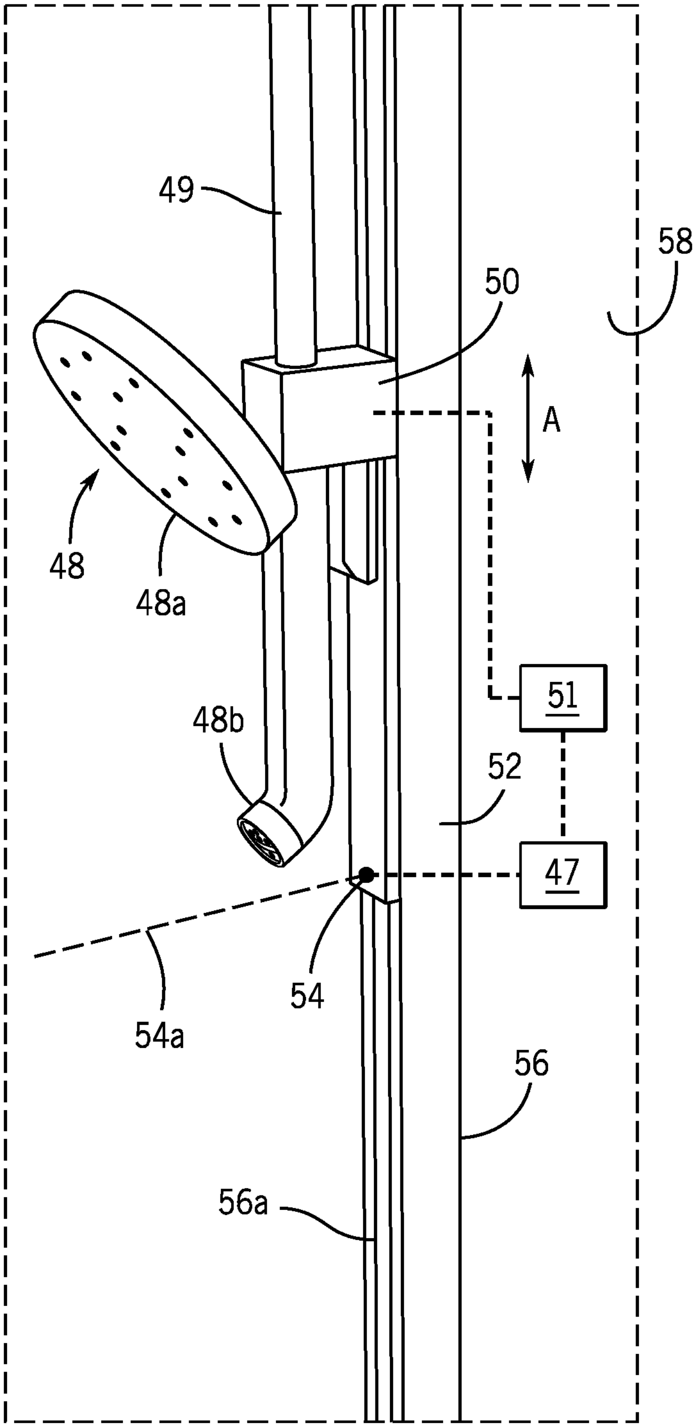
FIG. 10 is a partial perspective of a height-adjustable handheld sprayer of a shower system according to an exemplary embodiment.

Referring to FIG. 10, a shower column 56 having an automatic configuration for adjusting the height at which a handheld sprayer 48 is maintained is shown, according to an exemplary embodiment. It should be appreciated that the following description of the automatic height adjustment configuration may be similarly applied to the shower columns/handheld sprayers of the embodiments of FIGS. 1-2. As shown in the embodiment of FIG. 10, the handheld sprayer 48 is shown in a docked position, biased against a receiver 50. The handheld sprayer 48 includes a primary sprayhead 48*a* and a secondary sprayhead 48*b* disposed on a handle of the sprayer. According to an exemplary embodiment, the primary sprayhead 48*a* is configured to provide a primary spray, such as for the body of a user, and the secondary sprayhead 48*b* is configured to provide a secondary spray, such as for the face of a user. The receiver 50 is coupled to or integrally formed with a body 52, which is movably coupled to the shower column 56. In particular, the shower column 56 is shown to include a track 56*a* extending along a longitudinal length of the column 56. The body 52 is engaged with the track 56*a* and is configured to move along the track 56*a* in a direction indicated generally by arrow "A" in FIG. 10, so as to selectively change the height at which the handheld sprayer 48 is positioned. In this way, the positions of the primary sprayhead 48*a* and the secondary sprayhead 48*b* can be selectively adjusted relative to a user, so as to provide for an improved user experience, as compared to conventional shower columns with handheld sprayers having fixed heights.

According to an exemplary embodiment, one of the receiver 50 and the body 52 includes an electric motor 51 configured to operate a mechanical member (e.g., a driven member, a gear, etc.) that is selectively engaged with the track 56*a*, so as to allow for longitudinal movement of the receiver 50 and the handheld sprayer 48 along the track 56*a*. According to another exemplary embodiment, which is described in further detail in U.S. Provisional Application No. 62/718,473, titled "SHOWERHEAD WITH PIN PLATE," the entire disclosure of which is hereby incorporated by reference herein, the body 52 includes a user interface that is electrically coupled to the handheld sprayer 48 and to a controller which controls a mechanical member within the receiver 50, so as to allow a user to selectively lock/unlock the receiver 50 in place along the track 56*a*. As shown in the embodiment of FIG. 10, the body 52 includes a sensor 54 located on a facing surface of the body 52 that faces into the shower environment. The sensor 54 and the motor 51 are each operatively coupled to a control system 47 configured to allow for automatic control of the height of the handheld sprayer 48. The sensor 54 is positioned below the handheld sprayer 48 when the sprayer is biased or docked against the receiver 50, so as to provide a substantially clear line-of-sight into the shower environment. The sensor 54 is configured to detect various parameters of a user (e.g., the top of the user's head, etc.) in the shower environment using a zone of detection 54*a*, and to send a corresponding signal to the control system 47. In response, the control system 47 is configured to operate the electric motor 51 to selectively move the receiver 50 along the track 56*a* to a height that is, for example, a suitable distance above the top of the user's head (e.g., six inches, etc.), so as to provide for a user friendly position of the handheld sprayer 48. According to an exemplary embodiment, the sensor 54 is a laser sensor. According to other exemplary embodiments, the sensor 54 is a proximity sensor or other type of sensor configured to detect various parameters of a user in a shower environment.

Still referring to FIG. 10, the handheld sprayer 48 includes a flexible conduit 49 extending from an upper end of the sprayer through the receiver 50. The flexible conduit 49 is configured to extend through a support (e.g., support 17), behind a wall 58 of the shower environment, and be fluidly coupled to a water source. According to other exemplary embodiments, the flexible conduit 49 is routed behind the shower column itself, such as in the embodiments of FIGS. 1-2, or is routed through a separate enclosure/cover, such as in the embodiment of FIG. 5. The flexible conduit 49 may be at least partially wound around a conduit reel (e.g., conduit reel 20, etc.) disposed behind the wall 58, and may be configured to be automatically retracted via the conduit reel, as explained above with reference to FIGS. 1-2. The handheld sprayer 48 may be biased against a lower portion of the receiver 50 by a biasing force from the conduit reel 20.

According to other exemplary embodiments, the handheld sprayer 48 is biased against the receiver 50 by a counterweight coupled to the flexible conduit 49, the details of which are described below with reference to FIGS. 11-15.

Figure 11:
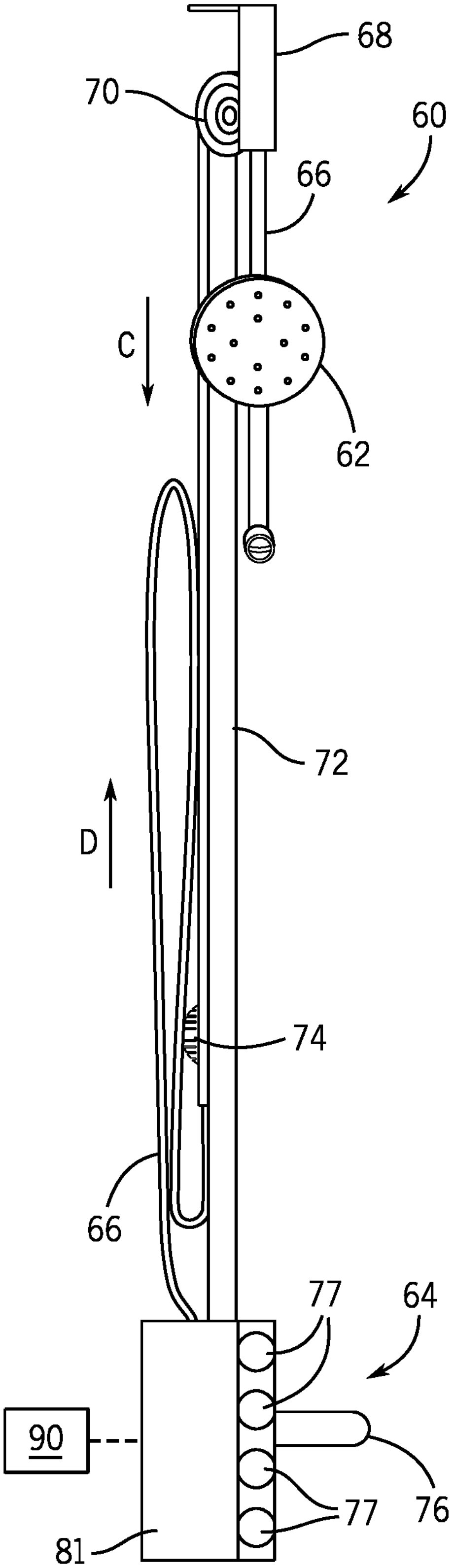
FIG. 11 is a front view of a shower system according to another exemplary embodiment.

Referring to FIGS. 11-13 and 15, a shower environment is shown to include a shower system 60 according to another exemplary embodiment. In this exemplary embodiment, the shower system 60 includes a shower column 72 having a mechanical configuration for adjusting the height at which a handheld sprayer 62 is maintained. It should be appreciated that the following description of the mechanical height adjustment configuration may be similarly applied to the shower columns/handheld sprayers of the embodiments of FIGS. 1-2. As shown in FIG. 11, the system 60 includes a handheld sprayer 62 coupled at an end of a flexible conduit 66, which may traverse through a receiver (e.g., receiver 84 shown in FIG. 14), loop at least partially around an upper support 70, and be counter-weighted by a weight 74 disposed on a portion of the flexible conduit 66 opposite the handheld sprayer 62. The flexible conduit 66 may be fluidly coupled to one or more water inlet lines, such as water inlet line 76, through various plumbing (e.g., a mixing valve 24, diverter valve 27, other fluid conduits, etc.) that is disposed behind or within a cover 81. The system 60 may include a user interface 64 including one or more controls 77 for controlling various parameters of the shower system, such as water temperature, water volume, spray modes, and on/off control of one or more water delivery devices in the system (e.g., handheld sprayer 62, etc.). The user interface 64 is electrically coupled to a control system 90 to enable control of various parameters of the system (e.g., spray modes, spray programs, etc.).

Still referring to FIG. 11, the upper support 70 is shown as a pulley that is rotatably coupled to an upper portion of the shower column 72. In the exemplary embodiment of FIGS. 11-13 and 15, the handheld sprayer 62 is free-hanging in the shower environment, and is not docked or received by a receiver. The handheld sprayer 62 is configured to be biased by the weight 74 to a free-standing location shown in FIG. 11, which may correspond to a docked position or a hands-free use position (e.g., a first position, etc.) of the handheld sprayer 62. The system 60 is configured such that a user may manually move or pull the handheld sprayer 62 downward away from the upper support 70 toward the user, as indicated generally by arrow "C" in FIG. 11, thereby causing the weight 74 to translate upwardly in a direction indicated generally by arrow "D". When the user wishes to return the handheld sprayer 62 back toward the shower column 72, the user can release the sprayer, and the biasing force of the weight 74 can automatically pull the sprayer upward back to the free-standing location shown in FIG. 11.

Figure 12:
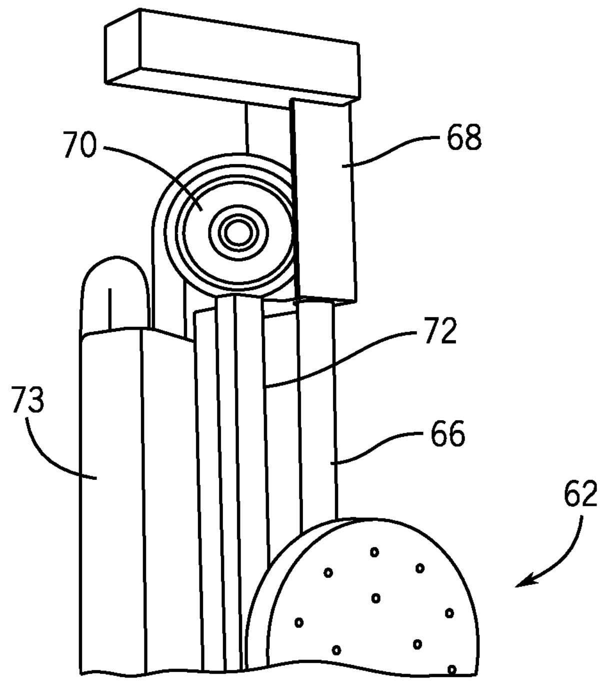
FIG. 12 is a partial perspective view of an upper portion of the shower system of FIG. 11.
Figure 15:
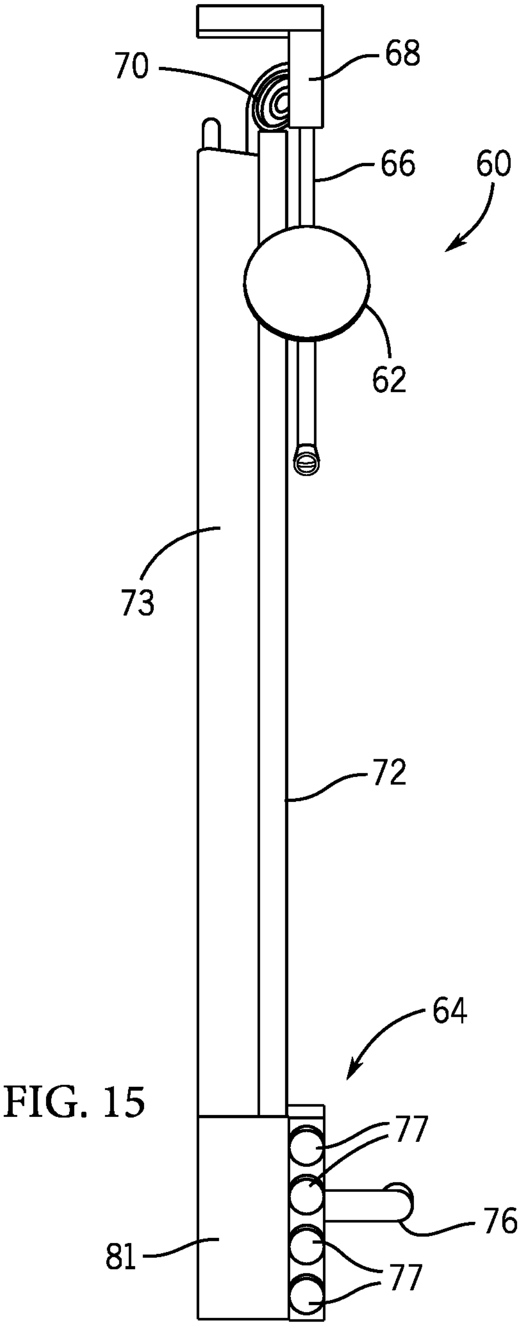
FIG. 15 is a front view of the shower system of FIG. 11 according to another exemplary embodiment.

According to the exemplary embodiment of FIG. 12, the upper support 70 is shown as a pulley that is rotatably coupled to an upper portion of the column 72. The pulley defines a pivot axis for the flexible conduit 66, and the pulley is configured to rotate when the handheld sprayer is selectively moved from the free-standing position. A conduit cover 68 is shown disposed over a portion of the flexible conduit 66 and the upper support 70, so as to substantially conceal the upper support 70 from view of a user. The system 60 is further shown to include a cover 73 that is configured to substantially conceal a portion of the flexible conduit 66 that is routed behind the column 72 opposite the handheld sprayer 62. As shown in FIGS. 12 and 15, the cover 73 can extend longitudinally adjacent a substantial portion of the column 72, and can house or contain the additional length of the flexible conduit 66 including a counterweight coupled to the conduit 66.

Figure 13:
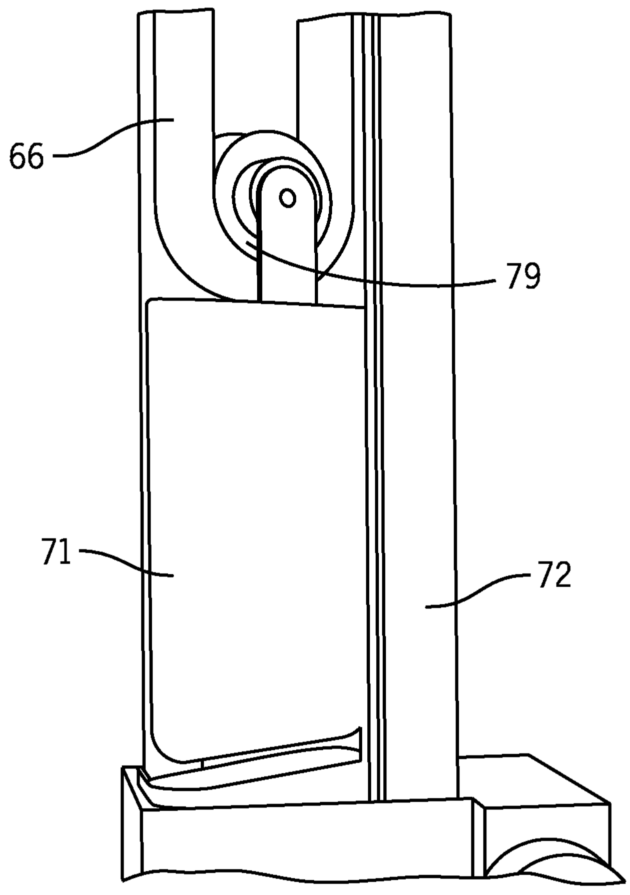
FIG. 13 is a partial perspective view of a lower portion of the shower system of FIG. 11.

For example, according to an exemplary embodiment shown in FIG. 13, the system can include a weight 71 that is rotatably coupled to a portion of the flexible conduit 66. Similar to the weight 74 discussed above, the weight 71 is configured to bias the handheld sprayer 62 to the free-standing position shown in FIG. 11. The weight 71 is shown to include a pulley 79 extending outwardly from an upper end of the weight 71, which is configured to receive the flexible conduit 66, such that the flexible conduit 66 is looped at least partially around the pulley 79. In this way, the weight 71 can hang freely downward below the portion of the flexible conduit 66 that is routed partially around the pulley 79. The pulley 79 is rotatably coupled to the weight 71, such that the weight 71 can translate upwardly in a longitudinal direction via rotational motion of the pulley 79 and the flexible conduit 66 when the handheld sprayer 62 is pulled away from the upper support 70 toward a user. Likewise, the weight 71 can translate downwardly in a longitudinal direction via opposite rotational motion of the pulley 79 and the conduit 66 when the handheld sprayer 62 is released by a user to return the handheld sprayer to the free-standing position shown in, for example, FIG. 12. As shown in FIG. 15, the cover 73 can substantially conceal the portion of the flexible conduit 66 that is routed behind/adjacent the column 72 along with the weight 71, so as to provide for a cleaner, more organized appearance.

Figure 14:
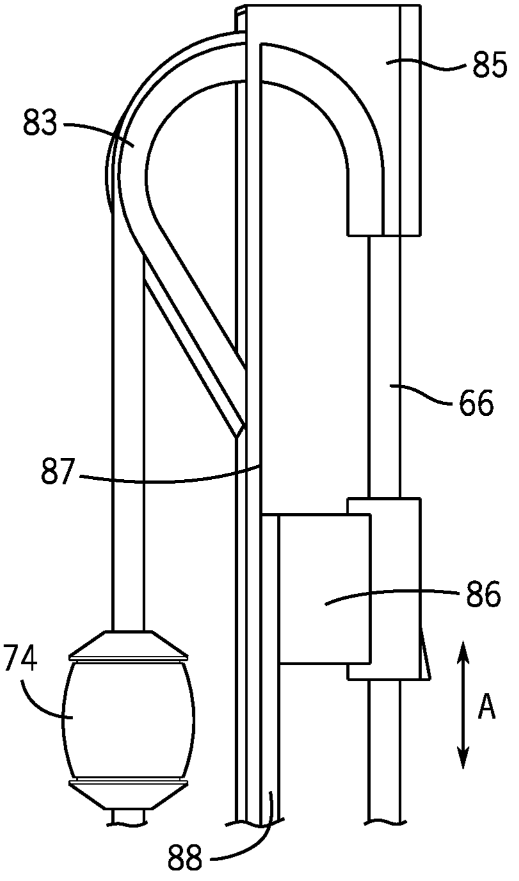
FIG. 14 is a partial side view of a shower system according to another exemplary embodiment.

Referring to FIG. 14, a portion of a shower column 87 is shown according to another exemplary embodiment. The shower column 87 can include components that are configured substantially the same as the components of shower system 60 described above in FIG. 15 (e.g., handheld sprayer 62, user interface 64, etc.). In this exemplary embodiment, however, the shower column 87 includes an upper support 83 that is fixed relative to the shower column 87, instead of as a rotatable pulley, like the upper support 70 of FIG. 15. That is to say, the upper support 83 is configured as a fixed guide member that defines a pivot axis to enable relative translational movement of the flexible conduit 66 along the support, such as when a user selectively moves a handheld sprayer coupled to the flexible conduit 66 toward or away from the column 87. A first portion of the upper support 83 is configured to be disposed behind a fixed wall of a shower environment, and a second portion of the upper support 83 is configured to be exposed in the shower environment opposite the first portion. In this way, the flexible conduit 66 can be routed through and at least partially around the first portion of the upper support 83 and the second portion of the upper support 83 behind a wall of the shower environment, so as to substantially conceal a portion of the flexible conduit 66. A conduit cover 85 is coupled to or integrally formed with the second portion of the upper support 83, so as to provide further concealment of the conduit 66 that is located in the shower environment.

As shown in FIG. 14, the conduit 66 includes the weight 74 coupled thereto and is disposed behind the wall of the shower environment, such that the weight 74 is also concealed from view. The shower column 87 is further shown to include a receiver 86 that is coupled to or integrally formed with a body 88, which is in moving engagement (e.g., slidably coupled, etc.) with the column 87 to allow for selective height adjustment of a handheld sprayer. According to an exemplary embodiment, the receiver 86, the body 88, and the column 87 are configured substantially the same as the corresponding components described above in the embodiment of FIG. 10, so as to allow for automatic sensing of a user to control the height of a handheld sprayer. According to another exemplary embodiment, which is described in further detail in U.S. Provisional Application No. 62/718,473, the body 88 includes a user interface that is electrically coupled to a handheld sprayer at an end of the fluid conduit 66 and to a controller which controls a mechanical member within the receiver 86, so as to allow a user to selectively lock/unlock the receiver 86 in place along the track of the column 87. In this way, the height of the handheld sprayer along the shower column 87 can be selectively adjusted either automatically (e.g., using an electronic sensor, etc.) or mechanically/manually (e.g., using a user interface with a button/mechanical member, etc.). The flexible conduit 66 can extend through the receiver 86, and a bottom portion of the handheld sprayer (not shown in FIG. 14) can engage the receiver when the handheld sprayer is in a docked or hands-free use position by a biasing force applied by the weight 74 on an opposite portion of the flexible conduit 66. In this manner, the weight 74 can act to selectively retract or extend the flexible conduit 66 from/into the shower environment, so as to provide for a more organized and user-friendly environment.

Figure 16:
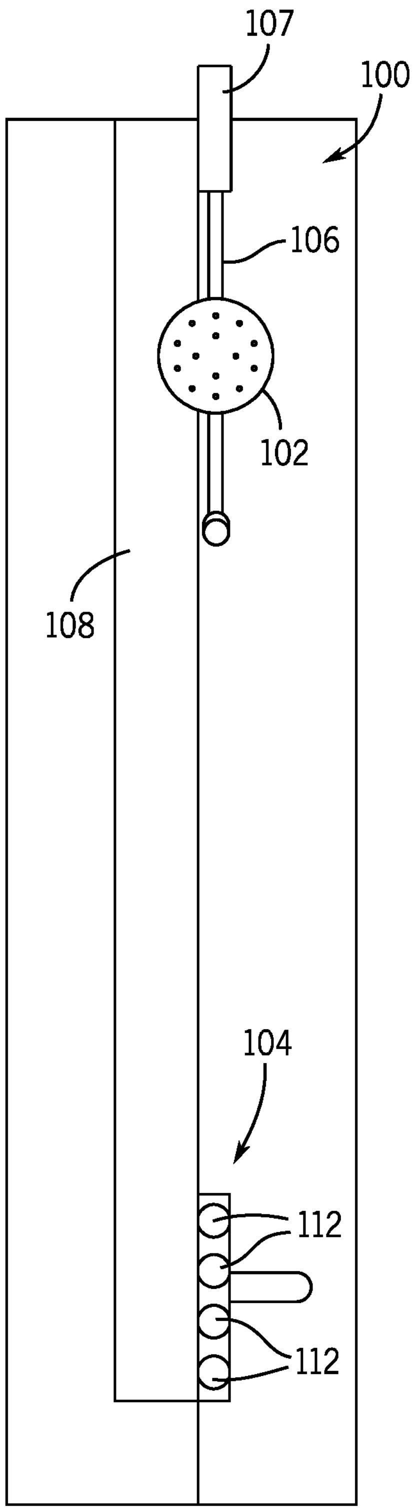
FIGS. 16-18 are front views of different shower system configurations according to various exemplary embodiments.
Figure 17:
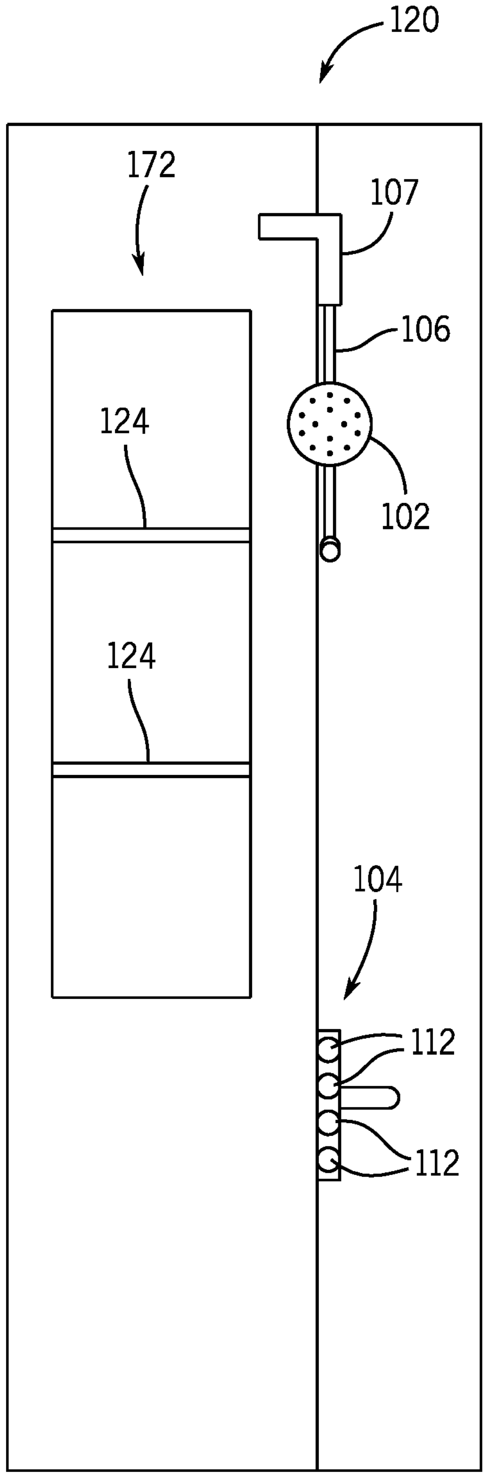
Figure 18:
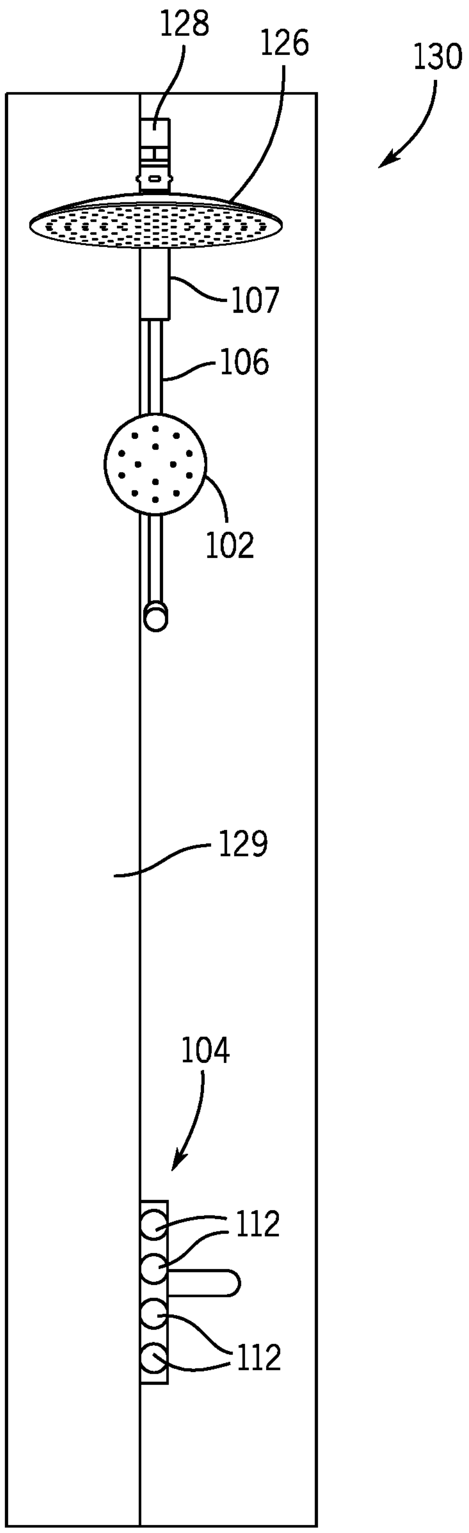

Referring to FIGS. 16-18, a plurality of different shower system configurations are shown according to various exemplary embodiments. It should be appreciated that any one of, or a combination of, the various configurations shown in FIGS. 16-18 can be applied to any of the shower systems that were previously discussed. In the exemplary embodiment of FIG. 16, a shower system 100 is shown to include a handheld sprayer 102 coupled to a flexible conduit 106. The flexible conduit 106 extends upwardly through an upper support 107 and downward behind a cover 108 (e.g., panel 108, enclosure 108, etc.). According to an exemplary embodiment, the cover 108 is part of the building structure that defines the shower environment (e.g., a wall, etc.), although the cover 108 may be a separate structure that is installed in the shower environment, according to other exemplary embodiments. According to various exemplary embodiments, the shower system 100 can include at least one of a conduit reel (e.g., conduit reel 20, etc.), a counterweight (e.g., weight 71, weight 74, etc.), or other device coupled to or otherwise engaged with the flexible conduit 106 behind the cover 108, so as to enable a user to selectively retract or extend a length of the flexible conduit 106 from/into the shower environment. The shower system 100 is further shown to include a user interface 104 including a plurality of controls 112 disposed at a lower portion of the cover 108 to allow a user to control various parameters of the system 100.

Referring to FIG. 17, a shower system 120 is shown to include a storage structure 122 including a plurality of recessed areas defined by shelves 124 according to another exemplary embodiment. In this exemplary embodiment, the storage structure 122 effectively replaces the cover 108 to provide for various storage solutions adjacent the shower column, but is otherwise configured the same as system 100. The flexible conduit 106 extends upwardly through an upper support 107 and downward behind the storage structure 122. Similar to the shower system 100, the shower system 120 can include at least one of a conduit reel (e.g., conduit reel 20, etc.), a counterweight (e.g., weight 71, weight 74, etc.), or other device coupled to or otherwise engaged with the flexible conduit 106 behind the storage structure 122, so as to enable a user to selectively retract or extend a length of the flexible conduit 106 from/into the shower environment.

Referring to FIG. 18, a shower system 130 is shown to include an elongated panel 129 and an overhead showerhead 126 according to another exemplary embodiment. In this exemplary embodiment, the panel 129 effectively replaces the cover 108/storage structure 122 to provide for a different aesthetic, and the overhead showerhead 129 is provided for additional functionality, but the system 130 is otherwise configured the same as systems 100/120 discussed above. As shown in FIG. 18, the overhead showerhead 126 is disposed above the handheld sprayer 102 and is fluidly coupled to a conduit 128 that extends behind the panel 129 toward a water source. The user interface 104 can include one or more controls 112 for selectively controlling the discharge of water from the handheld sprayer 102 and the overhead sprayhead 126.

Although only a few different shower system configurations have been depicted in FIGS. 16-18, it should be appreciated that other configurations are possible, including the use of different covers/panels to provide a different aesthetic, and/or the inclusion of additional water delivery devices or combinations of water delivery devices to provide different functionality.

Figure 19:
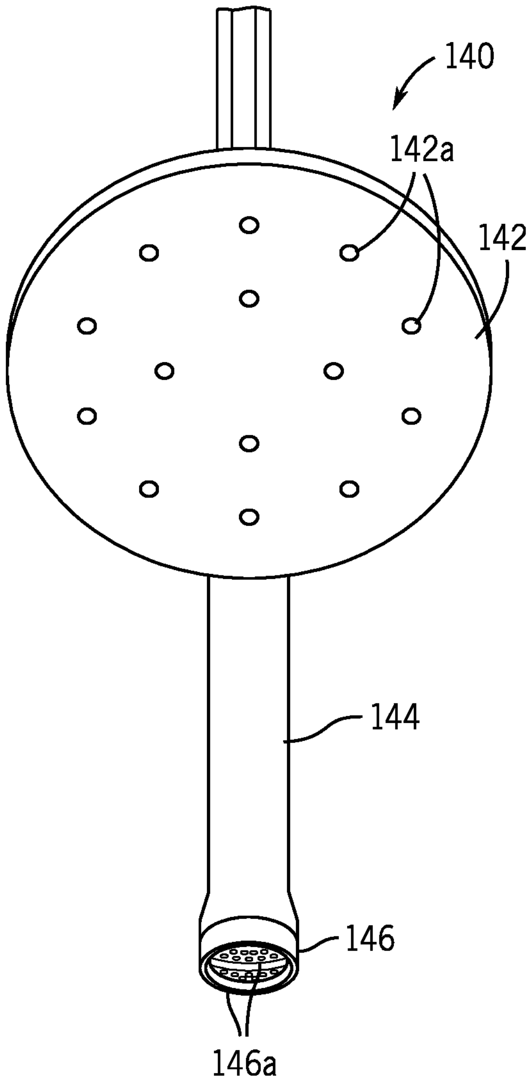
FIG. 19 is a front view of a handheld sprayer for a shower system according to an exemplary embodiment.

Referring to FIG. 19, a handheld sprayer 140 is shown according to an exemplary embodiment. The handheld sprayer 140 may be used as the handheld sprayer in any one of the shower systems discussed above, according to an exemplary embodiment. The handheld sprayer 140 is shown to include a primary sprayhead 142 and a secondary sprayhead 146 disposed below the primary sprayhead 142. The secondary sprayhead 146 is located on a lower portion of a handle 144 of the handheld sprayer 140, although the secondary sprayhead 146 may be locatd on a different portion of the handle 144, according to other exemplary embodiments. According to an exemplary embodiment, the secondary sprayhead 146 is located approximately 18" inches from the primary sprayhead 142, which is particularly advantageous for a user to use the secondary sprayhead 146 to wash their face. The primary sprayhead 142 includes a plurality of openings 142*a* configured to provide a primary spray, such as for the body of a user. The secondary sprayhead 146 includes a plurality of openings 146*a* configured to provide a secondary spray, such as for the face of a user.

Figure 20:
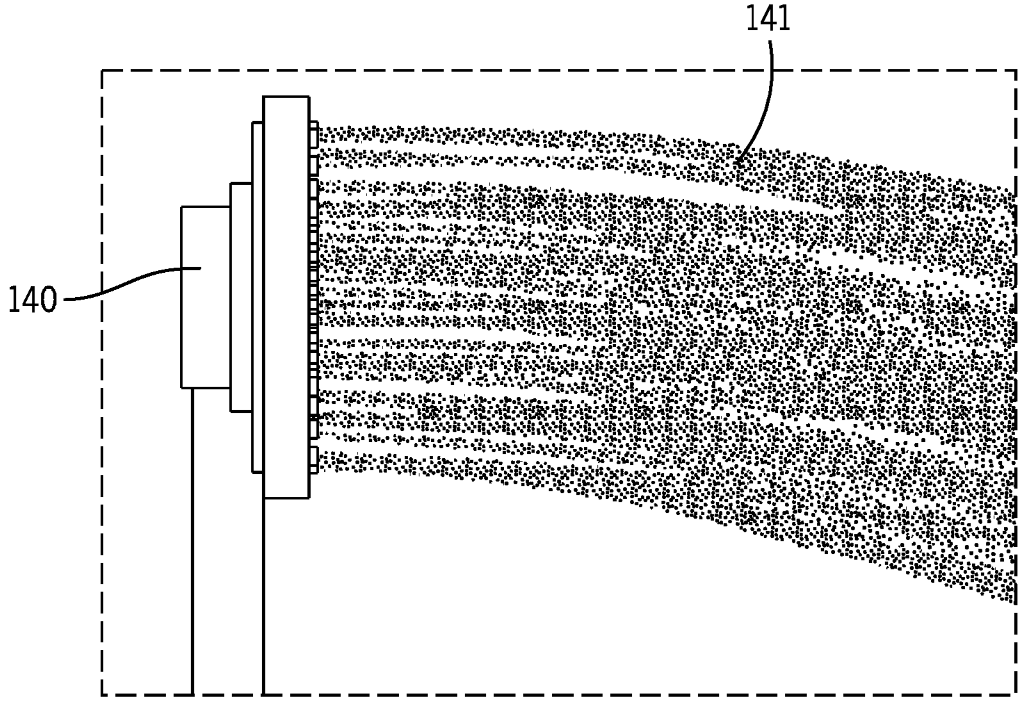
FIGS. 20-22 are side views of different spray modes of the handheld sprayer of FIG. 19 according to various exemplary embodiments.
Figure 21:
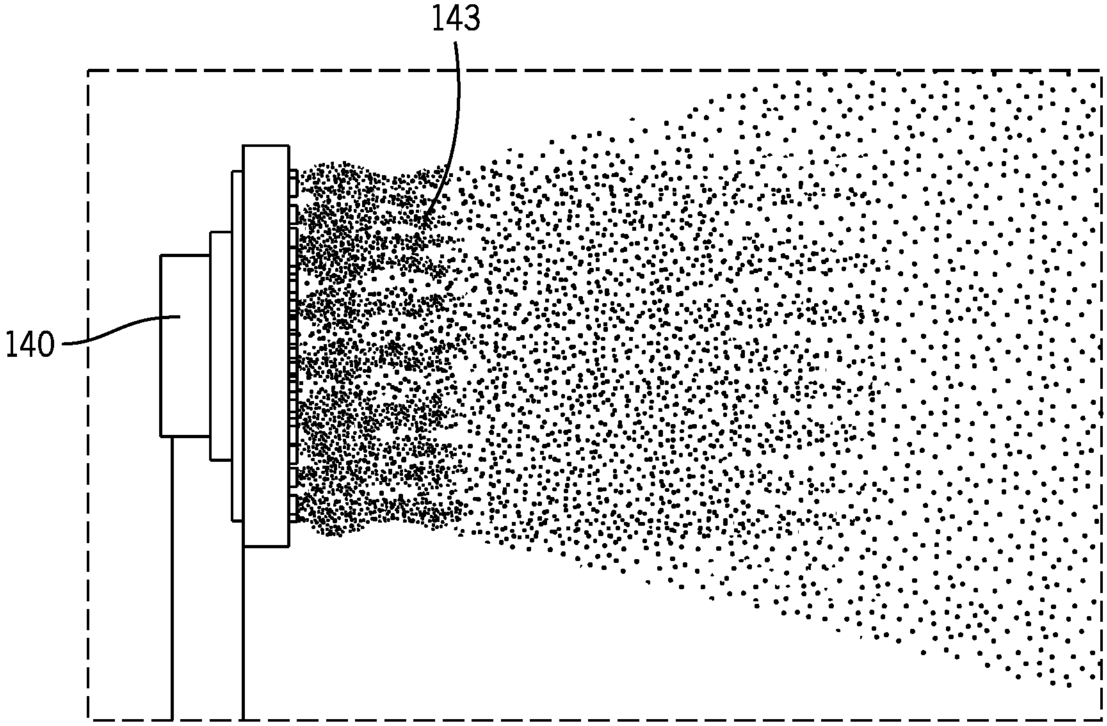
Figure 22:
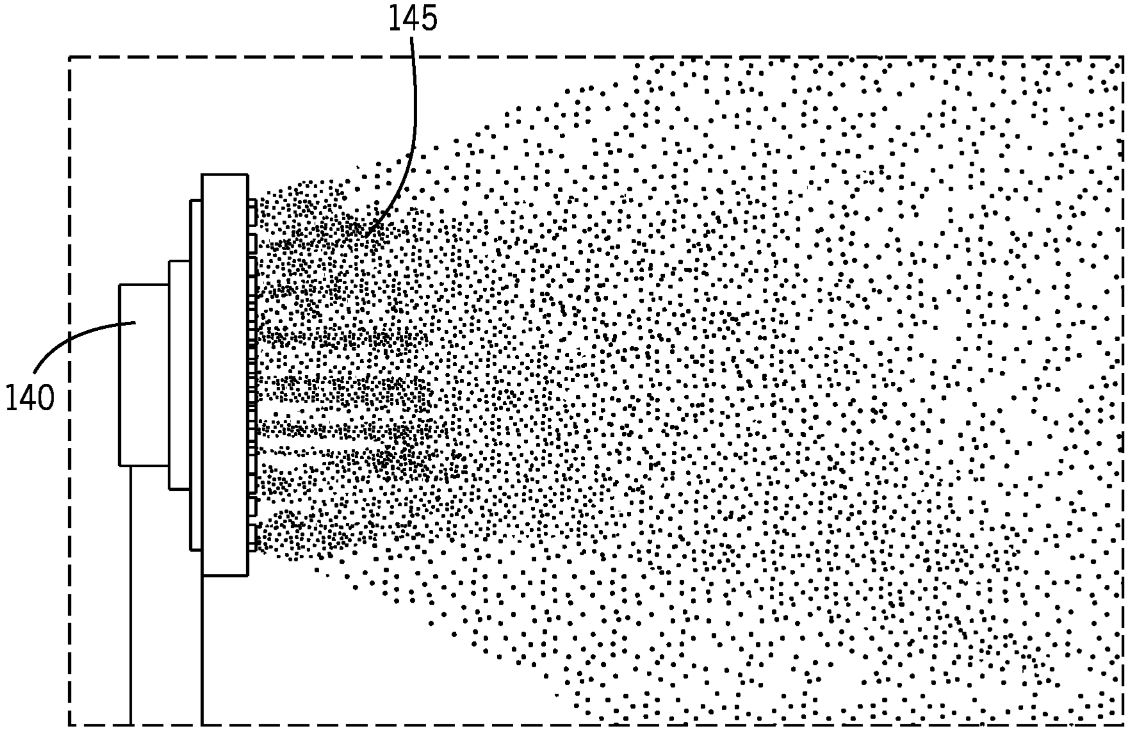

According to an exemplary embodiment, the handheld sprayer 140 can provide a plurality of different spray modes/spray patterns from the primary sprayhead 142, such as continuous streams/laminar flow (e.g., spray pattern 141 in FIG. 20), a spray mist (e.g., spray pattern 143 in FIG. 21), a pulsating spray (e.g., spray pattern 145 FIG. 22), or other types of spray patterns/modes. According to an exemplary embodiment, the handheld sprayer 140 includes one or more mechanical diverter valves that are selectively controllable via a user interface of the handheld sprayer 140, so as to provide the plurality of different spray modes and/or to switch between water discharge from the primary sprayhead 142 and the secondary sprayhead 146. According to another exemplary embodiment, the handheld sprayer 140 includes an electromagnetic configuration to allow for electronic control of a plurality of different spray modes via a user interface on the sprayer, such as the electromagnetic configuration described in U.S. Provisional Application No. 62/718,473.

Figure 23:
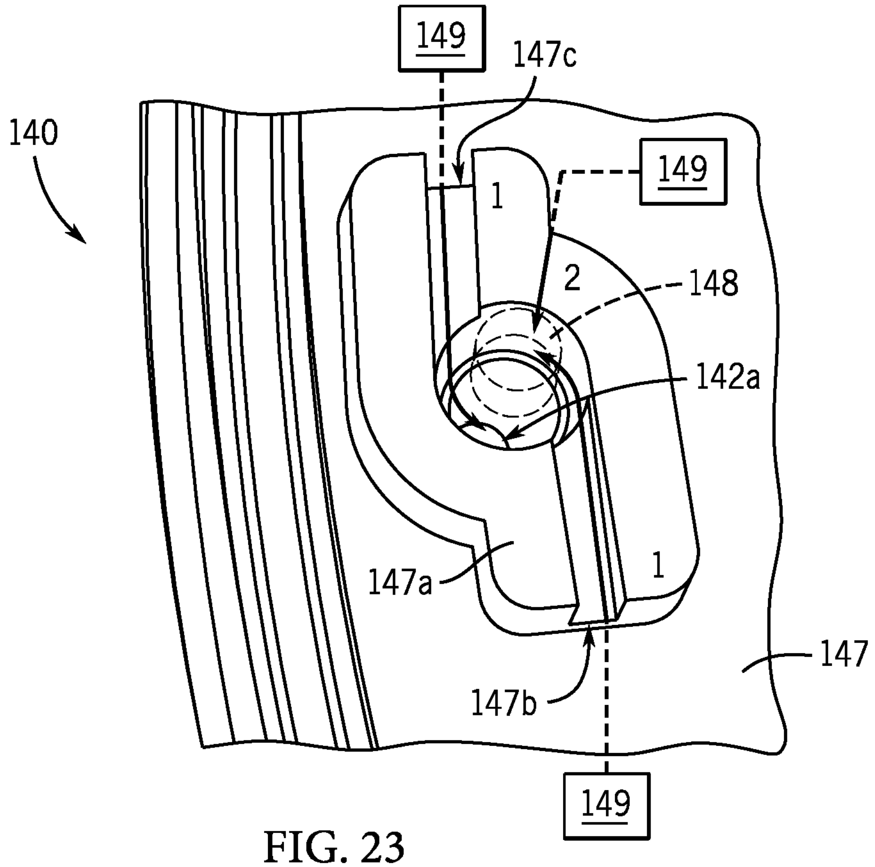
FIG. 23 is a partial cut-away view of the handheld sprayer of FIG. 19 according to an exemplary embodiment.

According to another exemplary embodiment shown in FIG. 23, the handheld sprayer includes a plurality of internal walls/layers disposed at different heights or levels within the sprayer that are in selective fluid communication with a water source by an electronically-controlled diverter that is located in the handle 144 of the sprayer. The plurality of internal walls/layers each include different internal channels that are in fluid communication with each of the plurality of openings 142*a* behind the spray face. The different internal walls/layers are in selective fluid communication with a water source by an electronically controlled diverter valve, so as to selectively provide a flow of water to the plurality of openings 142*a* from different channels within the sprayer. The various channels interface with each of the plurality of openings 142*a* at different relative positions, so as to create different spray patterns depending on which layer within the sprayer is receiving water. In this way, the handheld sprayer 140 does not include any mechanical moving parts within the sprayhead assembly, so as to provide for a more efficient design that is less prone to mechanical failure.

As shown in the exemplary embodiment of FIG. 23, the handheld sprayer 140 includes a first inner wall 147 that defines a first layer or level within the sprayer. An opening 142*a* of the sprayer extends through the first inner wall 147. A protrusion 147*a* extends upwardly from the first inner wall 147 and defines a first channel 147*b* and a second channel 147*c* that are each in fluid communication with the opening 142*a*. The first channel 147*b* is in fluid communication with a portion of the opening 142*a* at a first tangential interface. The second channel 147*c* is also in fluid communication with a portion of the opening 142*a*, but at a second tangential interface located opposite the first tangential interface. The first channel 147*b* and the second channel 147*c* are in selective fluid communication with a water source by a fluidic valve 149 via a first flow path. The opening 142*a* extends through the first inner wall 147 and through a second inner wall 148 disposed at a different height/level within the sprayer than the first inner wall 147. The second inner wall 148 defines a second layer or level within the sprayer 140. The portion of the opening 142*a* that extends through the second inner wall 148 is also in selective fluid communication with the water source by the fluidic valve 149 via a second flow path that is separate from the first flow path.

According to an exemplary embodiment, the fluidic valve 149 is an electronic valve (e.g., a solenoid valve, a multi-port valve, etc.) that is configured to be disposed remotely from the primary sprayhead 142, such as in the handle 144 of the sprayer. The fluidic valve 149 can be in electronic communication with a user interface and a control system disposed in the shower environment adjacent a shower column of the handheld sprayer (e.g., user interface 14, etc.) or disposed on the handheld sprayer 140 itself. The fluidic valve 149 is configured to selectively provide water to one or more of the different layers of the sprayer 140 via separate flow paths, so as to provide different spray modes/patterns of the handheld sprayer 140. In this way, the fluidic valve 149 and the control system cooperatively define an electronically-controlled diverter system of the handheld sprayer 140.

For example, in a first spray mode, the fluidic valve 149 can be selectively operated to provide a flow of water to only the first layer defined by the first inner wall 147 via a first flow path, such that the flow of water is directed to the first and second channels 147*b*, 147*c*. The two flows of water flowing through the first and second channels 147*b*, 147*c* can combine at the opening 142*a* to create a "swirling" effect that produces a first spray pattern. To change to a second spray mode, the fluidic valve 149 can be selectively operated to provide a flow of water to only the second layer defined by the second inner wall 148 via a second flow path, such that the flow of water passes through a single channel to the opening 142*a* to produce a second spray pattern that is different than the first spray pattern. It should be appreciated that other types of spray patterns can be achieved by operating the fluidic valve 149 to selectively provide water to a different layer/channel, or to different combinations of layers/channels, of the handheld sprayer 140. In addition, different spray patterns can be achieved by changing the orientation, number, or size of the fluid channels that interface with the openings 142*a* at each layer.

According to other exemplary embodiments, the handheld sprayer 140 includes one or more additional layers disposed therein, so as to provide additional spray modes/functions. For example, the handheld sprayer 140 can include an air infusion layer that is in selective fluid communication with an air supply source and one or more openings 142*a* of the handheld sprayer 140, so as to provide an aerated flow of water through the one or more openings 142*a*.

[Although the above description is directed to only one opening 142*a* of the handheld sprayer 140, it should be appreciated that the other openings 142*a* of the sprayer can have a similar configuration as described above. According to other exemplary embodiments, different groups of openings 142*a* can have the same or similar configuration, while other groups of openings 142*a* may have a different configuration (e.g., be in fluid communication with different channels or at different orientations, be in fluid communication with different layers, etc.). According to an exemplary embodiment, other water delivery devices in the shower system can have a similar configuration as the handheld sprayer 140 described above, such as an overhead showerhead, or the like.

Figure 24:
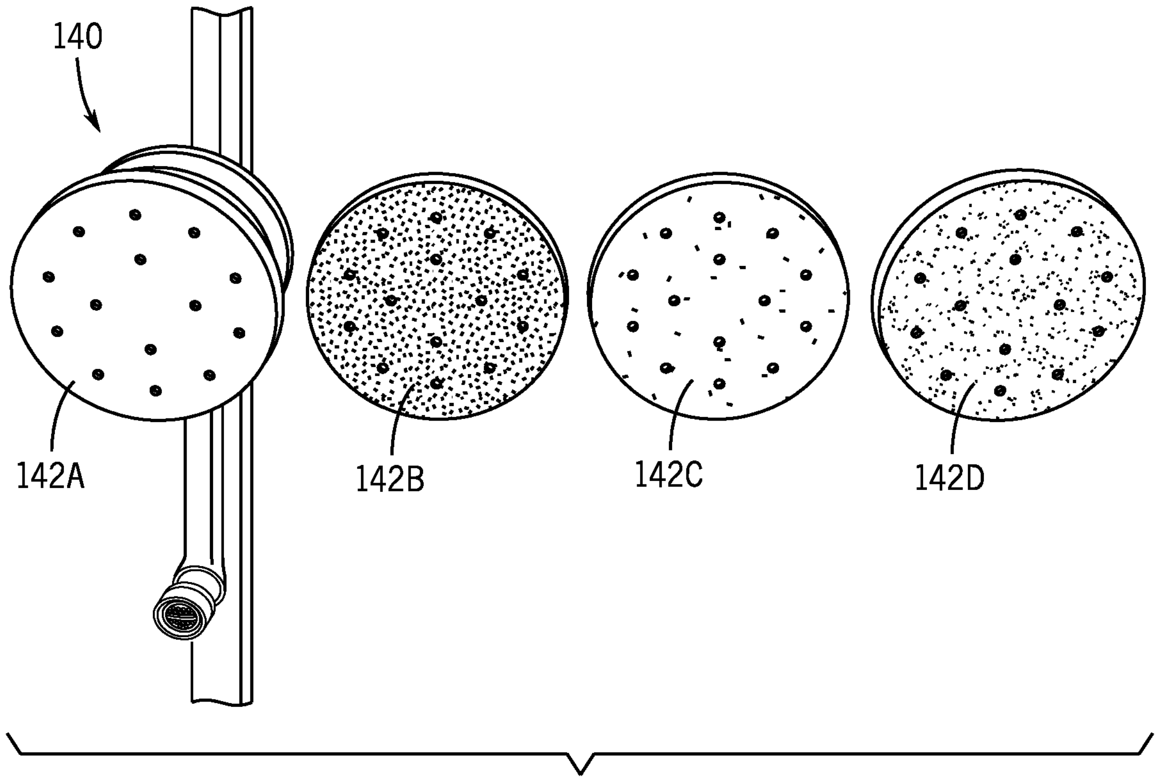
FIG. 24 is a front view of the handheld sprayer of FIG. 19 including a plurality of different spray faces according to various exemplary embodiments.

Referring to FIG. 24, the handheld sprayer 140 is configured to have a removable primary spray face 142A, such that the handheld sprayer 140 can be customized to have a plurality of different spray faces (e.g., spray faces 142B, 142C, 142D, etc.) made from different materials, depending on user preference. The handheld sprayer 140 is configured to be biased to a normal use position along a shower column using, for example, a counterweight (e.g., weight 71, weight 74, etc.) or a conduit reel (e.g., conduit reel 20, etc.). In this way, the relative weight of the handheld sprayer 140 can vary significantly without impacting the functionality or operation of the shower column (e.g., automatic retraction of the sprayer 140, biasing of the sprayer 140, etc.). Thus, the handheld sprayer 140 can use a variety of different spray faces made from different materials that have significantly different weights, such as plastic (spray face 142A), wood (spray face 142B), stone (spray face 142C), marble (spray face 142D), or other materials/combinations of materials. The various spray faces 142A, 142B, 142C, 142D can include openings disposed directly through the spray face material that define the discharge location of water through the sprayer 140, thereby eliminating the use of silicone nozzles, or nozzles made from other materials. In this manner, the handheld sprayer 140 can help to reduce the accumulation of bacteria that can cause clogging of the openings/nozzles in traditional handheld sprayers.

Figure 25:
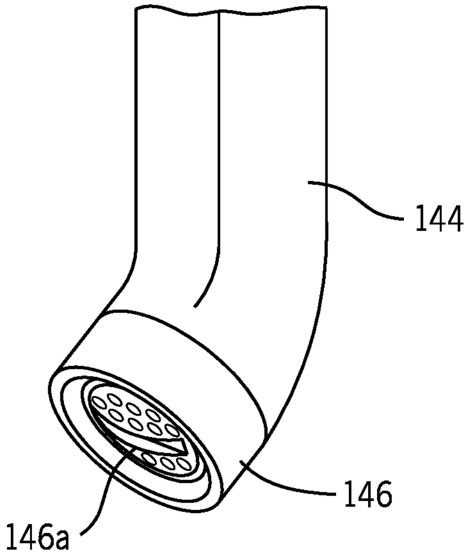
FIGS. 25-26 are partial perspective views of a lower portion of the handheld sprayer of FIG. 19 according to an exemplary embodiment.
Figure 26:
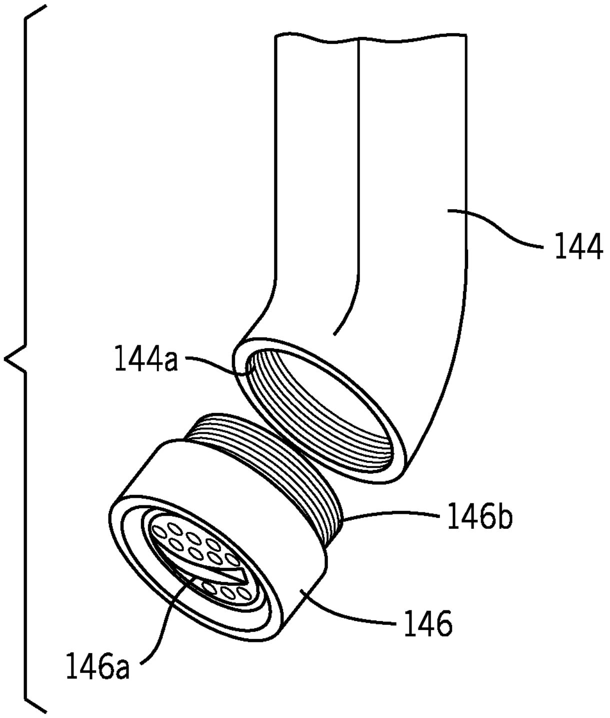

Referring to FIGS. 25-26, the lower portion 144 of the handheld sprayer 140 is shown to include a secondary sprayhead 146 that is removably coupled to the sprayer. According to the exemplary embodiment shown, the secondary sprayhead 146 is threadably coupled to the lower portion 144 by outer threads 146*b* that are configured to selectively engage inner threads 144*a* located on an inner portion of the sprayer 140. According to other exemplary embodiments, the secondary sprayhead 146 is removably coupled using other fastening arrangements, such as a bayonet-style interface, a press-fit interface, or other fastening arrangements. The secondary sprayhead 146 is configured to be selectively removed and replaced by a user with a different sprayhead having different spray characteristics, depending on user preference. For example, the secondary sprayhead 146 can be used to wash a user's face, based on its relative location on a shower column within a shower environment (see, for example, FIGS. 1-2). Thus, it is desirable to provide different spray patterns or modes for different users, as these users may desire different types of sprays to wash their faces. According to various exemplary embodiments, the secondary sprayhead 146 is configured to be selectively removed and replaced with a sprayhead that can provide at least one of a silk spray, a massage spray, a kinetic spray, a pulsating spray, a laminar spray, or other types of sprays.

Figure 27:
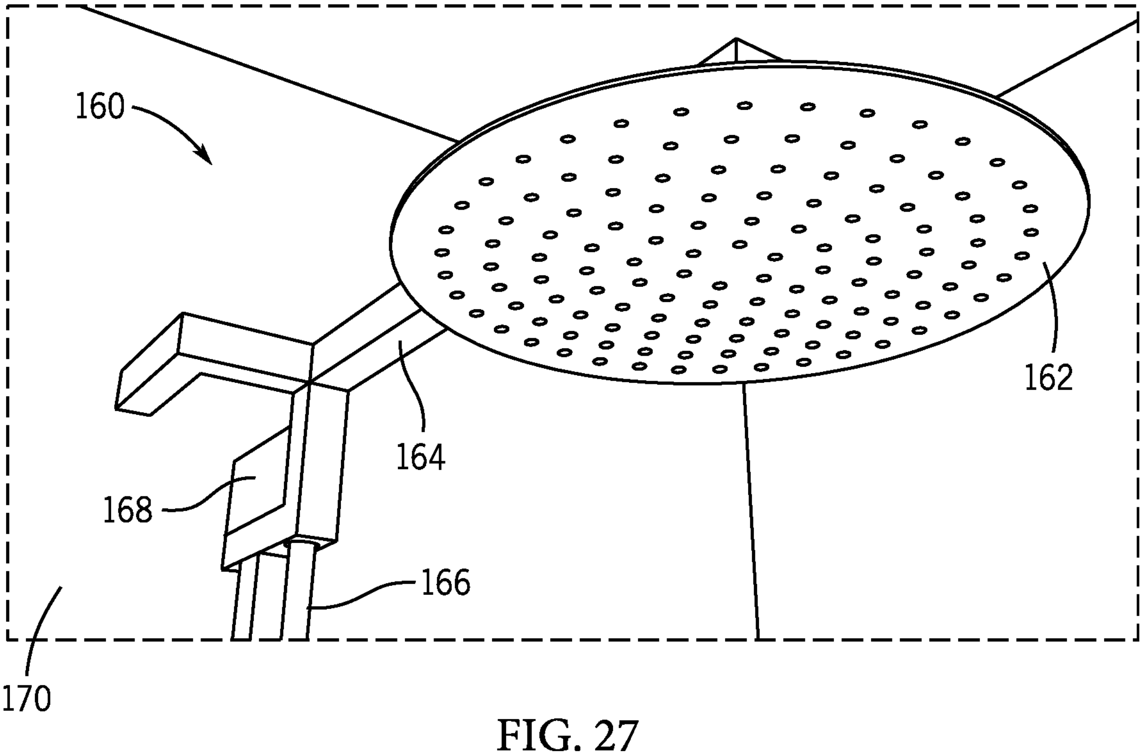
FIG. 27 is a partial perspective view of a shower system including an overhead sprayhead according to an exemplary embodiment.
Figure 28:
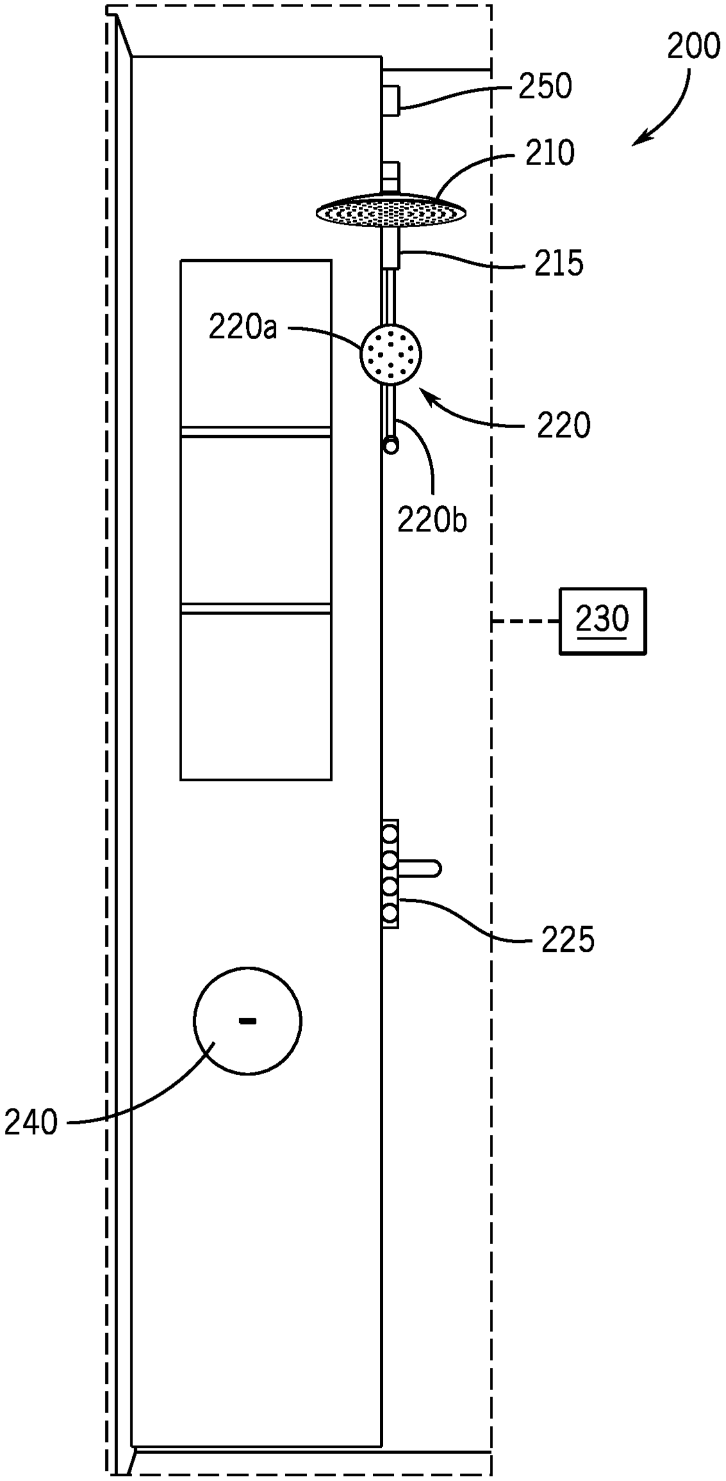
FIG. 28 is a front view of a shower system according to another exemplary embodiment.
Figure 29:
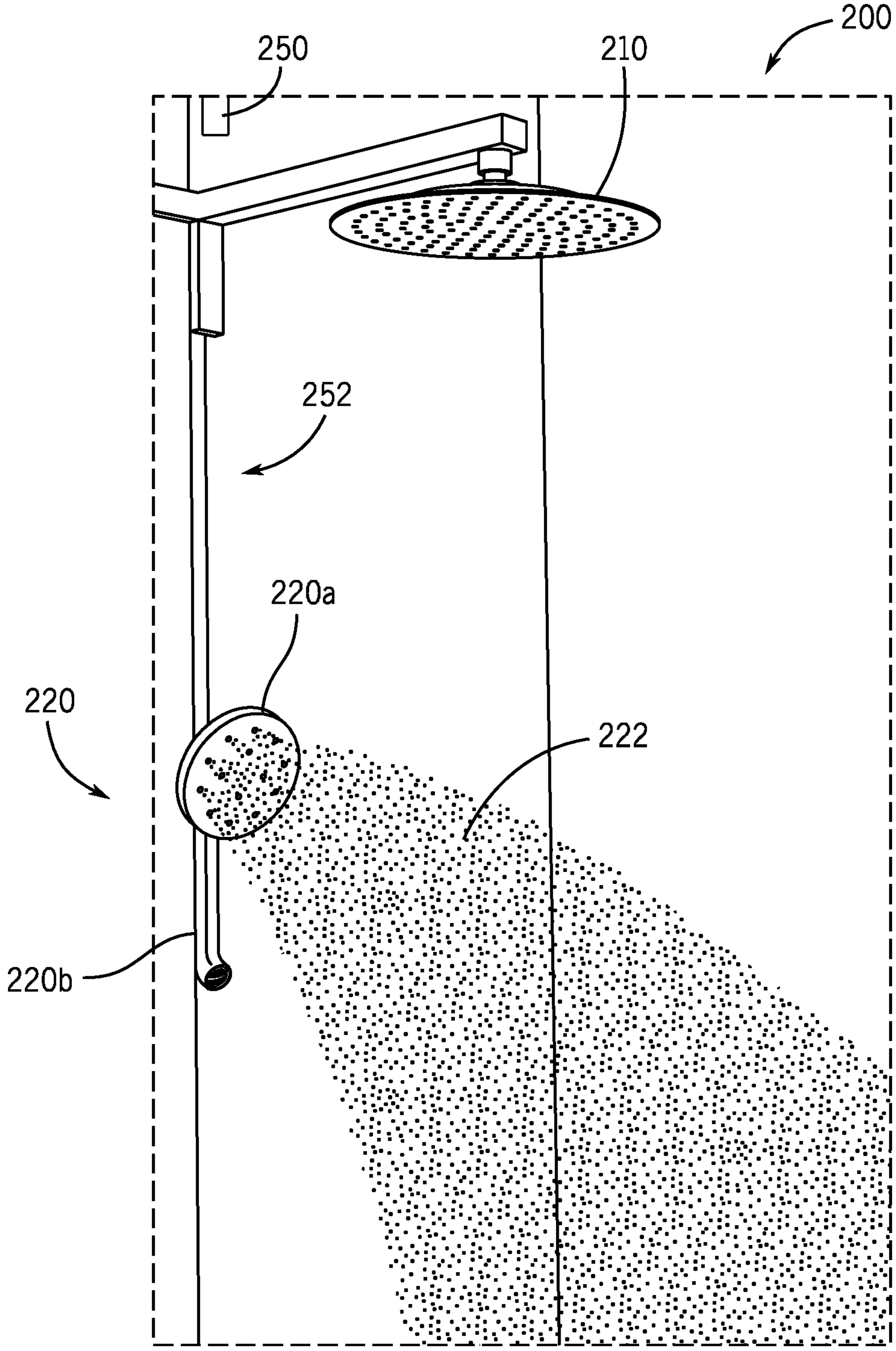
FIGS. 29-33 are perspective views of different spray modes of the shower system of FIG. 28 according to various exemplary embodiments.

Referring to FIG. 27, a shower system 160 is shown to include an overhead showerhead 162 according to another exemplary embodiment. The overhead showerhead 162 may be used as any of the overhead showerheads previously discussed in this application (e.g., overhead showerhead 13, etc.), according to an exemplary embodiment. The overhead showerhead 162 is fluidly coupled to a water source, such as a household water supply, by a fluid conduit 164 that is routed through a wall 170 of a building. According to another exemplary embodiment, the fluid conduit 164 is routed through a cover or other enclosure adjacent a shower column of the system 160. The overhead showerhead 162 is part of a shower system that also includes a shower column 168 including a flexible conduit 166 that fluidly couples a handheld sprayer (not shown) to the water source. The overhead showerhead 162 is configured to provide a plurality of different spray modes/patterns, such as a "rain" mode, a deluge or "rinse" mode, a "mist" spray, or other spray modes. According to an exemplary embodiment, the overhead showerhead 162 and the handheld sprayer are operatively coupled to a control system configured to allow for control of various parameters of the system, such as different spray programs, spray modes, water volume, water temperature, or other system settings.

Referring to FIGS. 28-34, a shower system 200 is shown according to another exemplary embodiment. The shower system 200 is shown to include an overhead showerhead 210 disposed above a shower column 215 including a handheld sprayer 220. The handheld sprayer 220 includes a primary sprayhead **220*a* and a secondary sprayhead 220*b*. The handheld sprayer 220 and the overhead showerhead 210 are each operatively coupled to a user interface 225. According to an exemplary embodiment, the overhead showerhead 210, the shower column 215, the handheld sprayer 220, and the user interface 225 can be configured the same as any one of, or a combination of, the overhead showerheads, shower columns, handheld sprayers, or user interfaces previously discussed in this application. The shower system 200 is further shown to include a speaker 240 and a light source 250 coupled in the shower environment, such as adjacent the shower column 215. The speaker 240 may form part of an entertainment system including, for example, an audio receiver/media player, an amplifier, additional speakers, or other audio equipment configured to provide audio entertainment for a user in the shower environment. The light source 250 may include one or more light modules configured to provide ambient illumination including different colors and intensities in the shower environment for a user. The overhead showerhead 210, the handheld sprayer 220, the user interface 225, the speaker 240, and the light source 250 are each operatively coupled to a control system 230. The control system 230** is configured to allow for control of various parameters of the system, such as the scheduling of different spray programs, synchronization of music and/or light with different spray modes, control of different spray modes, water temperature control, water volume control, automatic control of a height of the handheld sprayer, and other system parameters.

Figure 34:
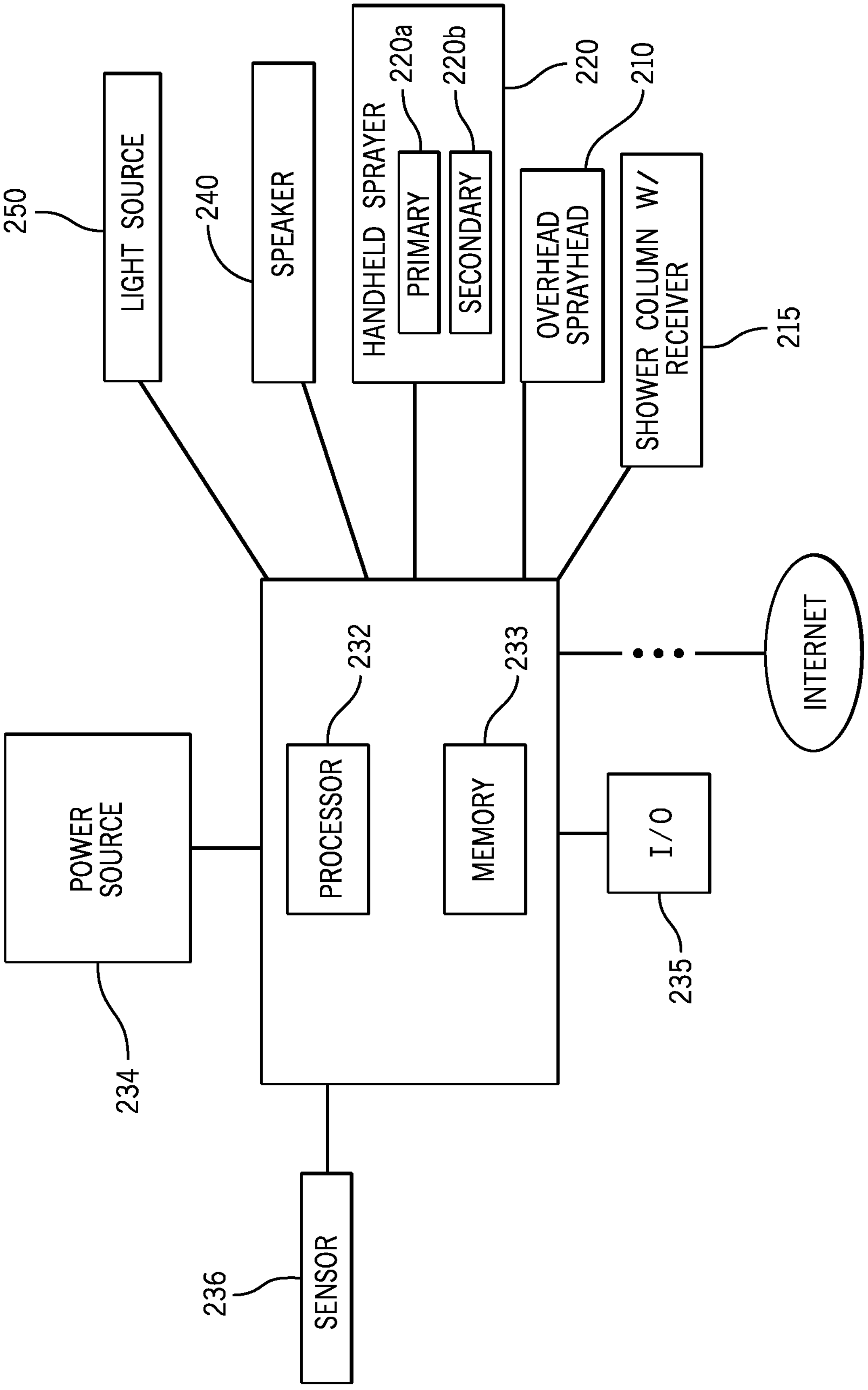
FIG. 34 is a block diagram of a control system for the shower system of FIG. 28 according to an exemplary embodiment.

For example, referring to FIG. 34, the control system 230 is shown to include a processing circuit 231 that includes a processor 232 and a memory 233. The processor 232 may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. The processor 232 also may be implemented as a combination of computing devices, such as a combination of a DSP and a microprocessor, a plurality of microprocessors, one or more microprocessors in conjunction with a DSP core, or any other such configuration. The memory 233 may include one or more devices (e.g., RAM, ROM, Flash memory, hard disk storage) for storing data and/or computer code for completing or facilitating the various processes described in the present disclosure. The memory 233 may be or include volatile memory or non-volatile memory, and may include database components, object code components, script components, or any other type of information structure for supporting the various activities and information structures described in the present disclosure. According to an exemplary embodiment, the memory 233 is communicably connected to the processor 232 via the processing circuit 231 and includes computer code for executing (e.g., by the processing circuit 231 or the processor 232) the one or more processes described herein.

Still referring to FIG. 34, the control system 230 is further shown to include a power source 234 for providing power to the system 200, which may be a normal household power source or may be a separate power supply removably coupled to the system 200 (e.g., a battery pack, etc.). The control system 230 may also include a sensor 236 (e.g., laser sensor, proximity sensor, etc.) for detecting a height of a user in the shower environment, so as to control a relative position of the handheld sprayer 220 along the shower column 215, such as that shown in the embodiment of FIG. 10. For example, the sensor 236 may be coupled to a receiver (e.g., receiver 50, etc.) that is movably coupled to the shower column 215 in the shower environment (e.g., by an electric motor 51, etc.). The sensor 236 may detect the top of a user's head in the shower environment, and then communicate this information to the processing circuit 231. In response, the processing circuit 231 may then control the position of the receiver along the shower column 215, so as to change the relative height of the handheld sprayer 220. According to an exemplary embodiment, the memory 233 can store different user settings that can be selectively retrieved, which may include, for example, a user's height or a user's desired position of the handheld sprayer 220 along the shower column 215.

According to the exemplary embodiment of FIG. 34, an input device 235 is communicably coupled to the processing circuit 231, and is configured to allow a user to control various parameters of the system. According to an exemplary embodiment, the input device 235 is an electronic device (e.g., a cellular phone (e.g., a "smart" phone), a remote control, a computing device such as a laptop computer, etc.) that can allow a user to remotely control various parameters of the shower system 200. According to another exemplary embodiment, the input device 235 is a user interface (e.g., user interface 225, etc.) that is disposed in the shower environment to allow for local control of various parameters of the shower system 200 (e.g., water temperature, water volume, spray modes, etc.).

According to an exemplary embodiment, the input device 235 can allow a user to provide different spray programs/experiences for different users of the shower system 200, which can be stored in the memory 233 for later retrieval. For example, a user can use the input device 235 to provide an audio input to the processing circuit 231 (e.g., by streaming audio from the Internet using a mobile application, etc.). The processing circuit 231 can receive and analyze the audio input, and in response, can provide the audio input to the entertainment system including the speaker 240, so as to provide audio entertainment for a user in the shower environment. The processing circuit 231 may be further configured to, for example, simultaneously control at least one of (a) the discharge of water from the overhead sprayhead 210 and/or the handheld sprayer 220, (b) the light output from the light source 250, and (c) the relative height of the handheld sprayer 220 along the shower column 215. According to an exemplary embodiment, the shower system 200 can include a synchronization mode in which the processing circuit 231 can synchronize the audio input with the discharge of water from the handheld sprayer 220 and the overhead sprayhead 210, and/or the output of light from the light source 250 in the system, so as to provide for an enhanced user experience (e.g., a pulsating spray and/or a flashing light output that pulsates/flashes in sync with the beat of the audio input, etc.). According to another exemplary embodiment, the processing circuit 231 can automatically create different spray programs and/or light programs based on the audio input (e.g., an audio input consisting of hard rock music may correspond to a hard/coarse spray discharge and a brightly colored light output, whereas soft rock music may correspond to a softer "silk" spray discharge and a softer colored light output, etc.).

Figure 30:
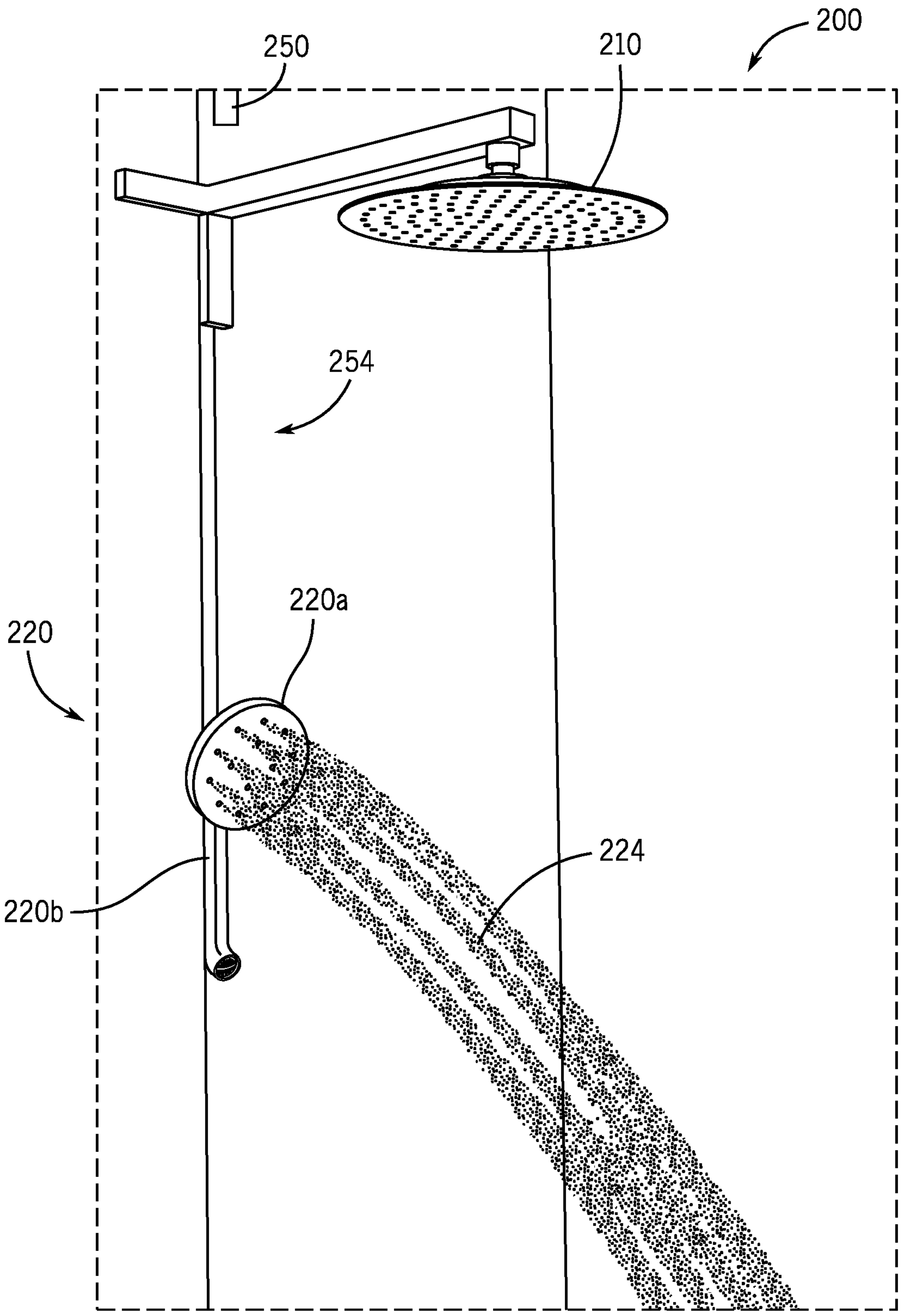
Figure 31:
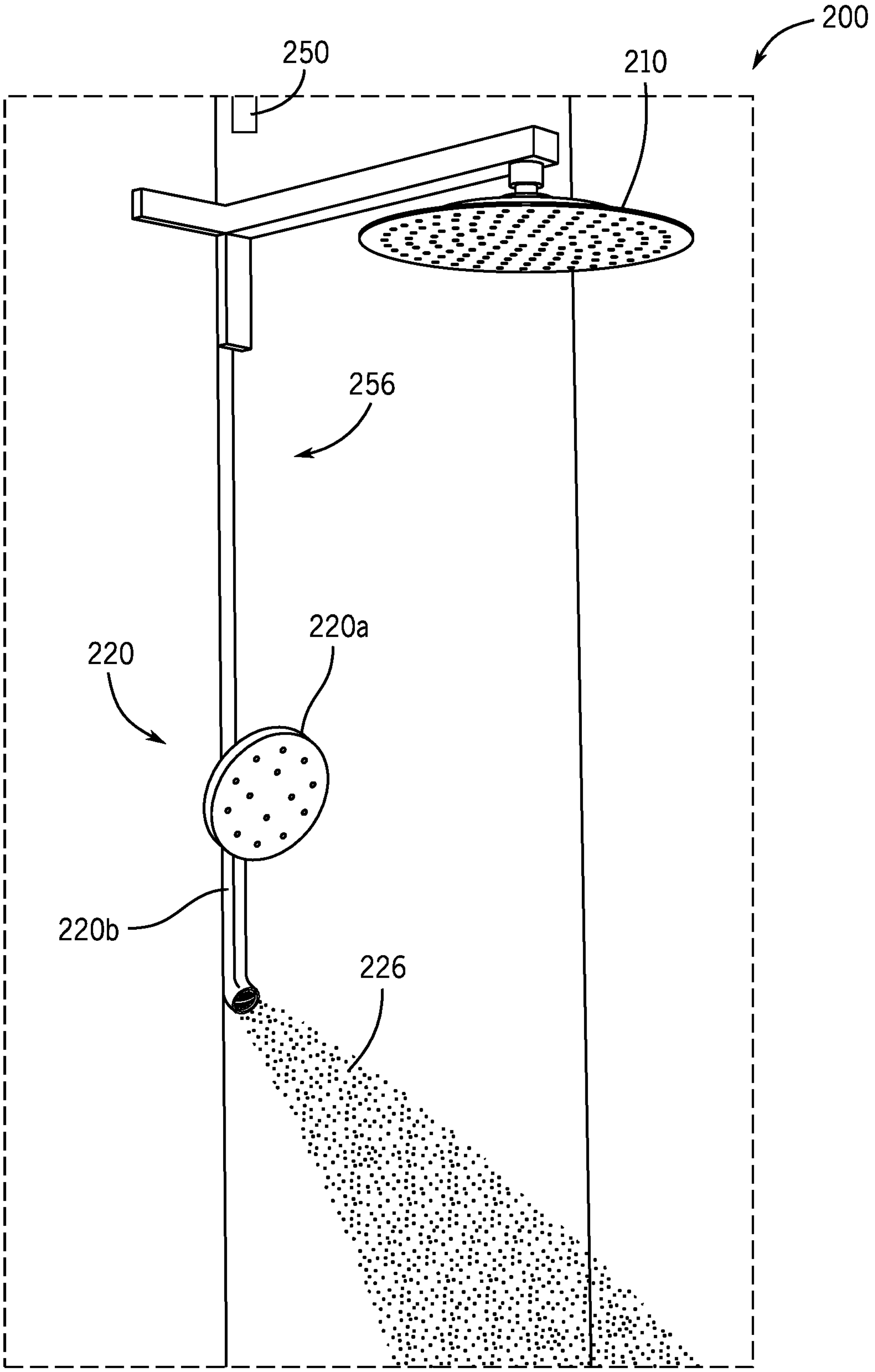
Figure 32:
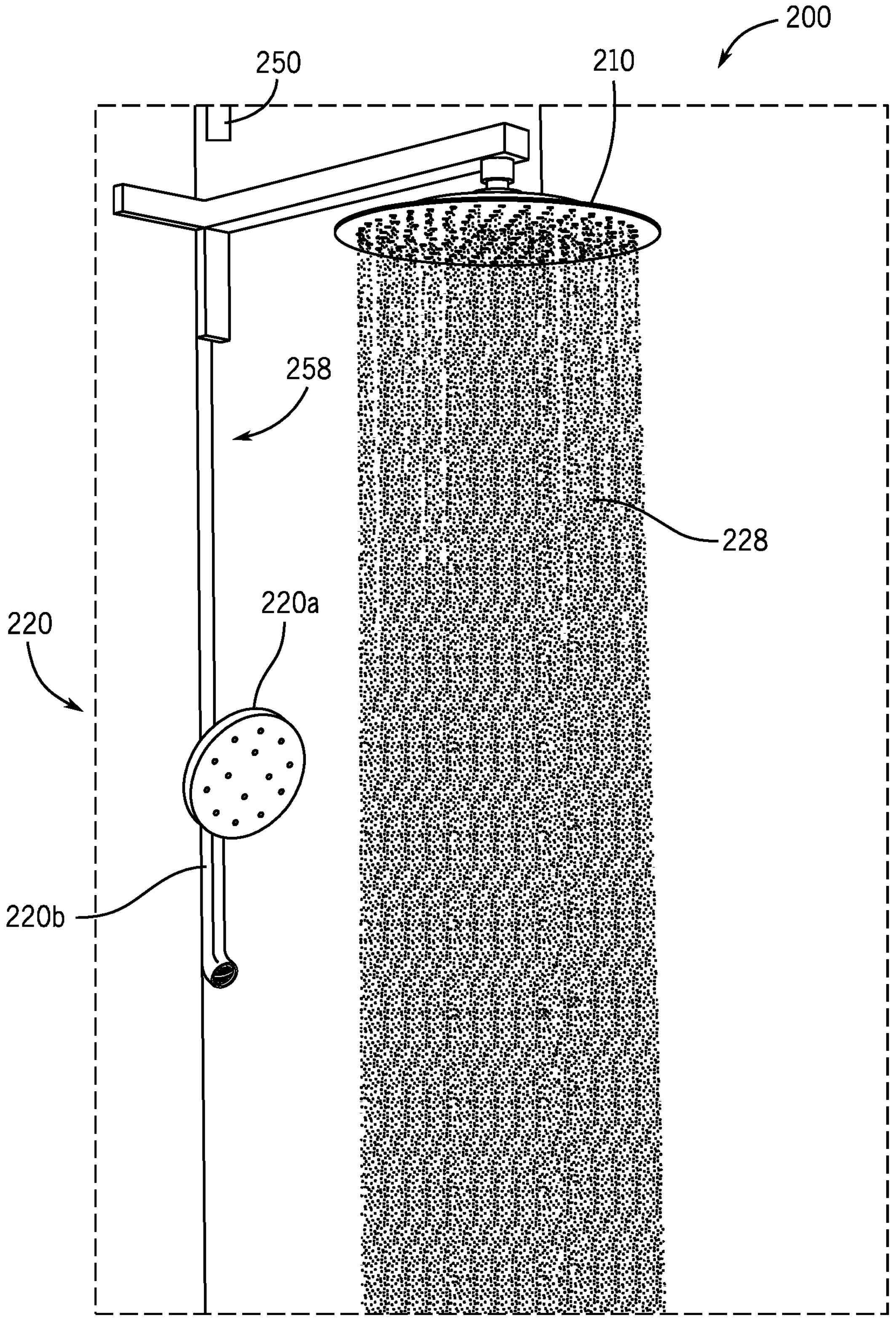
Figure 33:
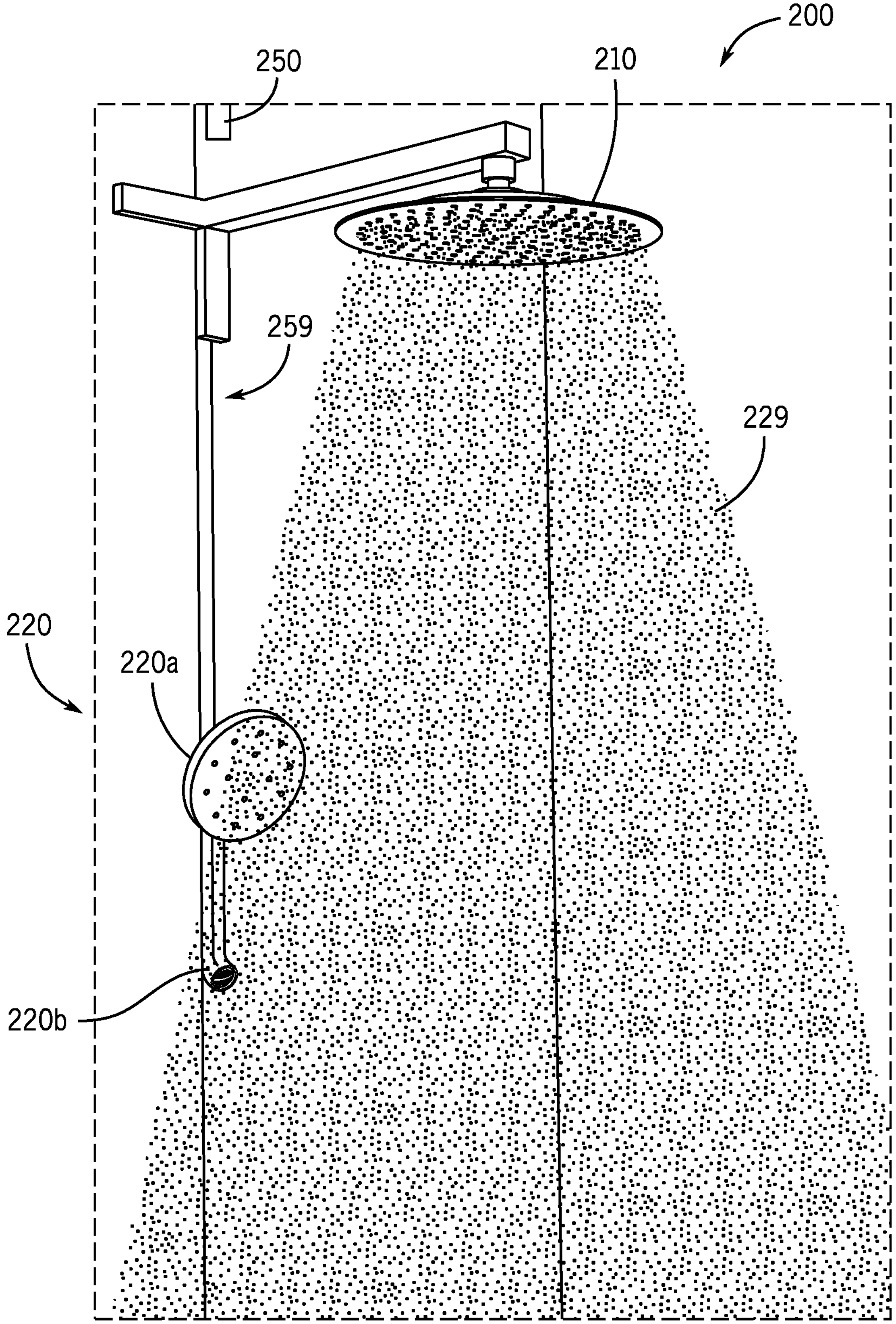

According to another exemplary embodiment, the shower system 200 can allow a user to create a customized spray program that comprises different combinations of spray modes from the handheld sprayer 220 and/or the overhead sprayhead 210. For example, referring to FIG. 29, the shower system 200 is configured to provide a first spray mode in which the primary sprayhead 220*a* of the handheld sprayer 220 provides a first spray 222, such as to pre-rinse the body of a user (e.g., mist spray, etc.). Referring to FIG. 30, the shower system 200 is configured to provide a second spray mode in which the primary sprayhead 220*a* provides a second spray 224 different than the first spray 222, such as to rinse the body of a user (e.g., a laminar spray, etc.). Referring to FIG. 31, the shower system 200 is configured to provide a third spray mode in which the secondary sprayhead 220*b* provides a third spray 226, such as to wash the face of a user (e.g., a silk spray, etc.). Referring to FIG. 32, the shower system 200 is configured to provide a fourth spray mode in which the overhead sprayhead 210 provides a fourth spray 228, such as to provide an overhead rinse for a user (e.g., a "rain" or deluge mode, etc.). Referring to FIG. 33, the shower system 200 is configured to provide a fifth spray mode in which the overhead sprayhead 210 provides a fifth spray 229, such as to provide an overhead mist for a user (e.g., a mist spray, etc.).

Each of the above discussed spray modes can be scheduled/controlled by a user to occur at different intervals, occur for different durations, occur in different combinations with each other (e.g., after predetermined or scheduled periods of time, etc.), occur using different flow rates, occur using different water temperatures, and the like. Although only a few different spray modes have been discussed herein, it should be appreciated that the handheld sprayer 220 and the overhead sprayhead 210 may be configured to provide other types of sprays or combinations of sprays according to other exemplary embodiments.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the various systems shown in the various exemplary embodiments is illustrative only. Additionally, any element disclosed in one embodiment may be incorporated or utilized with any other embodiment disclosed herein. For example, the automatic height adjustment configuration shown in FIG. 10 can be used in the shower system shown in FIG. 28. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A shower system, comprising:

a sprayer moveably coupled with a shower column, the sprayer configured to move in a vertical direction along the shower column; and a control system operably coupled with the sprayer;

wherein the control system comprises a sensor configured to detect a height of a user and an actuator configured to automatically change a position of the sprayer in the vertical direction along the shower column to a predetermined vertical distance relative to the user responsive to detecting the height of the user.

2. The shower system of claim 1, wherein the control system is further configured to control a spray mode of the sprayer.

3. The shower system of claim 1, wherein the control system is further configured to control a fluid temperature of the sprayer.

4. The shower system of claim 1, wherein the sensor comprises a laser sensor.

5. The shower system of claim 1, further comprising a light source, wherein the control system is operably coupled with the light source and configured to control the light source.

6. The shower system of claim 1, further comprising an audio source, wherein the control system is operably coupled with the audio source and configured to control the audio source.

7. The shower system of claim 1, further comprising a showerhead fixed to the shower column above the sprayer.

8. A shower system, comprising:

a column having a track;

a sprayer coupled with the track, the sprayer configured to move in a vertical direction along the track; and a control system comprising a sensor configured to detect a height of a user and an actuator configured to automatically change a position of the sprayer in the vertical direction along the track to a predetermined vertical distance relative to the user responsive to detecting the height of the user.

9. The shower system of claim 8, wherein the control system is further configured to control a spray mode of the sprayer.

10. The shower system of claim 8, wherein the control system is further configured to control a fluid temperature of the sprayer.

11. The shower system of claim 8, wherein the sensor comprises a laser sensor.

12. The shower system of claim 8, further comprising a light source, wherein the control system is operably coupled with the light source and configured to control the light source.

13. The shower system of claim 8, further comprising an audio source, wherein the control system is operably coupled with the audio source and configured to control the audio source.

14. The shower system of claim 8, further comprising a showerhead fixed to the column above the sprayer.

15. A shower system, comprising:

a column having a track;

a sprayer coupled with the track, the sprayer configured to move in a vertical direction along the track;

a showerhead coupled with the column; and a control system operably coupled with the sprayer and the showerhead;

wherein the control system comprises a sensor configured to detect a height of a user and an actuator configured to automatically change a position of the sprayer in the vertical direction along the track to a predetermined vertical distance relative to the user responsive to detecting the height of the user.

16. The shower system of claim 15, wherein the control system is further configured to control a spray mode of at least one of the sprayer or the showerhead.

17. The shower system of claim 16, further comprising:

an entertainment system including at least one of a light source or an audio source;

wherein the control system is configured to synchronize the entertainment system with the spray mode.

18. The shower system of claim 1, wherein the control system is configured to change the position of the sprayer along the shower column without a user input to the control system.

19. The shower system of claim 1, wherein:

the sensor is configured to detect the height of the user by detecting a top of a head of the user; and the predetermined vertical distance is relative to the top of the head of the user.

20. The shower system of claim 1, wherein the sensor is disposed along the shower column at a location beneath the sprayer.

* * * * *